US009298061B2

(12) United States Patent
Shintani

(10) Patent No.: US 9,298,061 B2
(45) Date of Patent: Mar. 29, 2016

(54) SHUTTER DEVICE

(71) Applicant: Panasonic Corporation, Osaka (JP)

(72) Inventor: Dai Shintani, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/500,210

(22) Filed: Sep. 29, 2014

(65) Prior Publication Data

US 2015/0093105 A1  Apr. 2, 2015

(30) Foreign Application Priority Data

Oct. 2, 2013  (JP) ................................. 2013-207676

(51) Int. Cl.
| | |
|---|---|
| *G03B 9/32* | (2006.01) |
| *G03B 9/16* | (2006.01) |
| *G03B 9/42* | (2006.01) |

(52) U.S. Cl.
CPC ... *G03B 9/16* (2013.01); *G03B 9/42* (2013.01)

(58) Field of Classification Search
CPC .............. G03B 9/00; G03B 9/08; G03B 9/28; G03B 9/30; G03B 9/32; G03B 9/34; G03B 9/36; G03B 9/40; G03B 9/42
USPC ......................................................... 396/480
See application file for complete search history.

(56) References Cited

U.S. PATENT DOCUMENTS 5,361,110 A * 11/1994 Haraguchi .................... 396/402
2004/0018015 A1   1/2004 Seita

FOREIGN PATENT DOCUMENTS

| JP | 62-022636 | 2/1987 |
|---|---|---|
| JP | 2000-075356 | 3/2000 |
| JP | 2004-061865 | 2/2004 |

* cited by examiner

*Primary Examiner* — Clayton E Laballe
*Assistant Examiner* — Fang-Chi Chang
(74) *Attorney, Agent, or Firm* — Renner, Otto, Boisselle & Sklar, LLP

(57) ABSTRACT

A shutter device includes a leading drive lever configured to move leading blades to a closed position at which the leading blades cover an opening and to move the leading blades to an open position at which the leading blades open the opening; a leading charge mechanism configured to rotate a leading charge lever in a charge direction to generate biasing force and to rotate, using the biasing force of the leading drive spring, the leading charge lever in a drive direction to rotate the leading drive lever in an opening direction; a leading lock lever configured to lock the leading charge lever having rotated in the charge direction; a leading attractive unit configured to hold, using electromagnetic force, the leading lock lever locking the leading charge lever; and a leading biasing mechanism configured to bias the leading lock lever in a release direction.

27 Claims, 20 Drawing Sheets

SHUTTER DEVICE

CROSS-REFERENCE TO RELATED APPLICATION

This application claims priority to Japanese Patent Application No. 2013-207676 filed on Oct. 2, 2013, the entire disclosure of which is incorporated by reference herein.

BACKGROUND

The technique disclosed herein relates to a shutter device.

Conventionally, shutter devices each including at least one of a leading curtain or a trailing curtain have been known. For example, Japanese Unexamined Patent Publication No. 2004-061865 discloses a focal plane shutter device including leading and trailing curtains. Japanese Unexamined Patent Publication No. 2004-061865 discloses the normally-open focal plane shutter device.

SUMMARY

In the shutter device of this type, it is necessary that a drive spring for leading or trailing curtain is winded up before exposure to generate biasing force. Then, until the exposure begins, the drive spring stands by in the state in which the biasing force is held. For such a stand-by state, it is necessary that the drive spring is held in a winded-up state. Considering reduction in device size and power consumption, force for holding the drive spring is preferably small.

The technique disclosed herein has been made in view of the foregoing, and provides a shutter device which reduces force for maintaining the state in which biasing force is held at a drive spring.

A shutter device disclosed herein includes a base plate in which an opening is formed; a leading blade capable of opening/closing the opening; a leading drive member configured to rotate in a closing direction to move the leading blade to a closed position at which the leading blade covers the opening and to rotate in an opening direction opposite to the closing direction to move the leading blade to an open position at which the leading blade opens the opening; a leading charge mechanism including a leading drive spring and a leading charge member configured to elastically deform the leading drive spring and configured to rotate the leading charge member in a charge direction in which the leading drive spring is elastically deformed to generate biasing force and to rotate, using the biasing force of the leading drive spring, the leading charge member in a drive direction opposite to the charge direction to cause the leading charge member to rotate the leading drive member in the opening direction; a leading lock member configured to lock the leading charge member having rotated in the charge direction; a first leading hold member configured to hold, using electromagnetic force, the leading lock member locking the leading charge member; and a leading biasing mechanism configured to generate biasing force for biasing the leading lock member in a release direction in which the leading charge member is unlocked after the leading lock member is held by the first leading hold member.

The shutter device disclosed herein includes a base plate in which an opening is formed; a trailing blade capable of opening/closing the opening; a trailing drive member configured to rotate in an opening direction to move the trailing blade to an open position at which the trailing blade opens the opening and to rotate in a closing direction opposite to the opening direction to move the trailing blade to a closed position at which the trailing blade covers the opening; a trailing charge mechanism including a trailing drive spring and a trailing charge member configured to elastically deform the trailing drive spring and configured to rotate the trailing charge member in a charge direction in which the trailing drive spring is elastically deformed to generate biasing force and to rotate, using the biasing force of the trailing drive spring, the trailing charge member in a drive direction opposite to the charge direction to cause the trailing charge member to rotate the trailing drive member in the closing direction; a trailing lock member configured to lock the trailing charge member having rotated in the charge direction; a first trailing hold member configured to hold, using electromagnetic force, the trailing lock member locking the trailing charge member; and a trailing biasing mechanism configured to generate biasing force for biasing the trailing lock member in a release direction in which the trailing charge member is unlocked after the trailing lock member is held by the first trailing hold member.

According to the shutter device, force for maintaining the state in which biasing force is held at the drive spring can be reduced.

DETAILED DESCRIPTION

Embodiments are described in detail below with reference to the attached drawings. However, unnecessarily detailed description may be omitted. For example, detailed description of well known techniques or description of the substantially same elements may be omitted. Such omission is intended to prevent the following description from being unnecessarily redundant and to help those skilled in the art easily understand it.

Inventor(s) provides the following description and the attached drawings to enable those skilled in the art to fully understand the present disclosure. Thus, the description and the drawings are not intended to limit the scope of the subject matter defined in the claims.

An example embodiment will be described below in detail with reference to drawings.

[1. Outline of Configuration]

Figure 1:
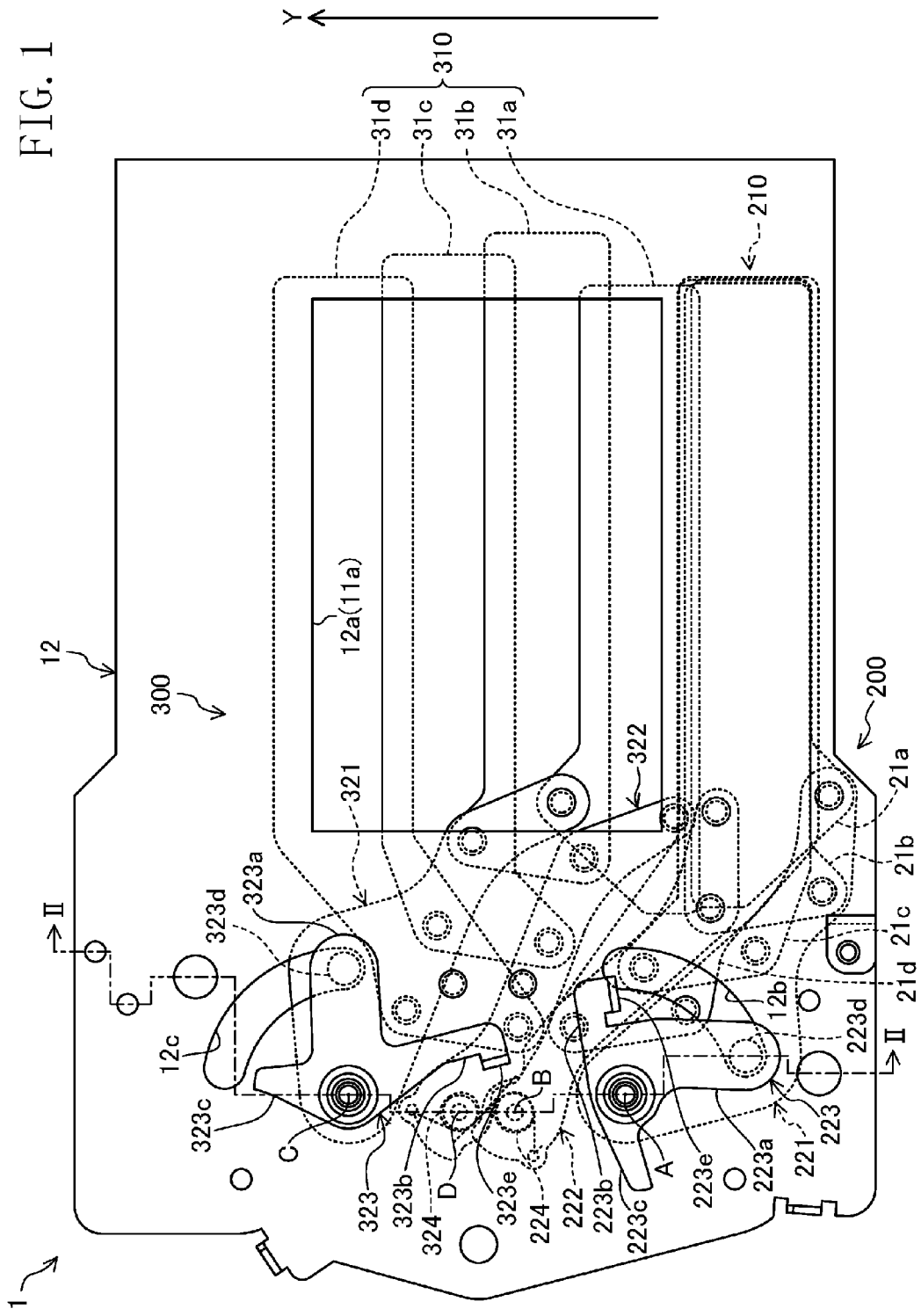
FIG. 1 is a back view of a shutter device.
Figure 2:
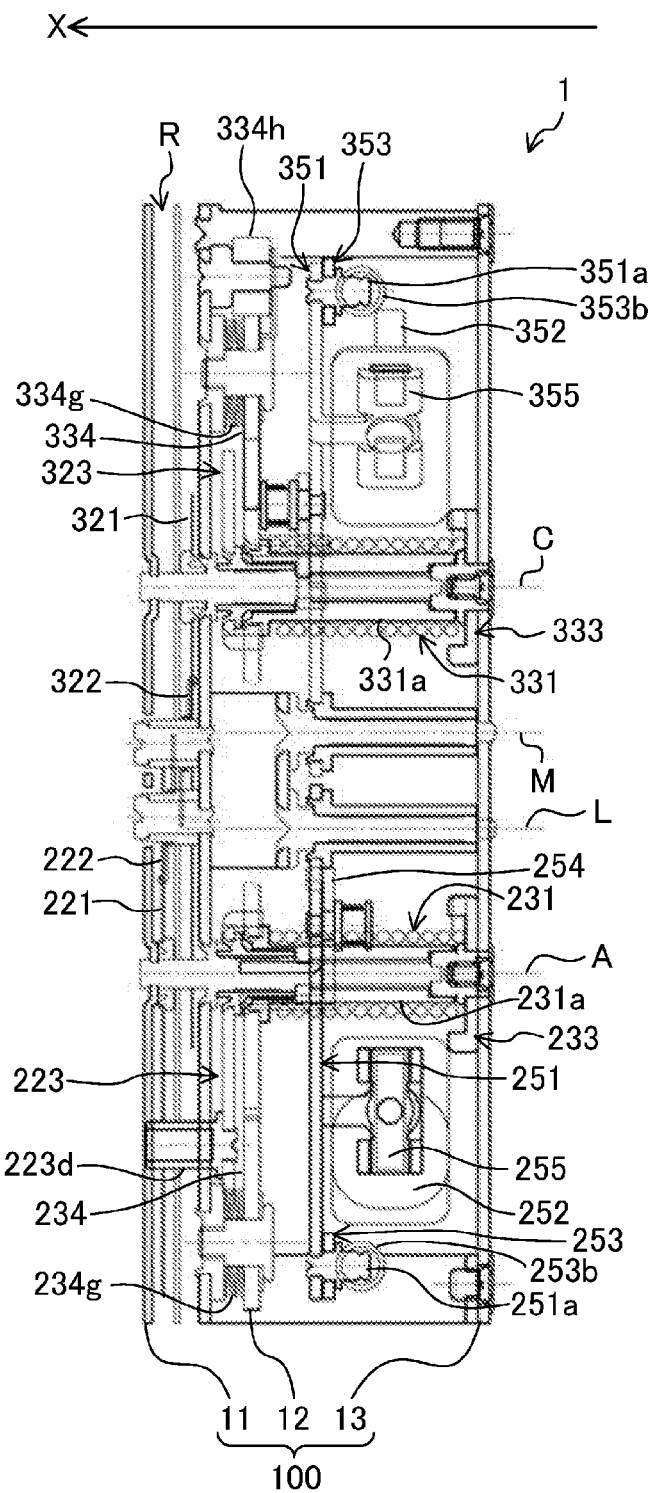
FIG. 2 is a cross-sectional view of the shutter device along an II-II line of FIG. 1.
Figure 3:
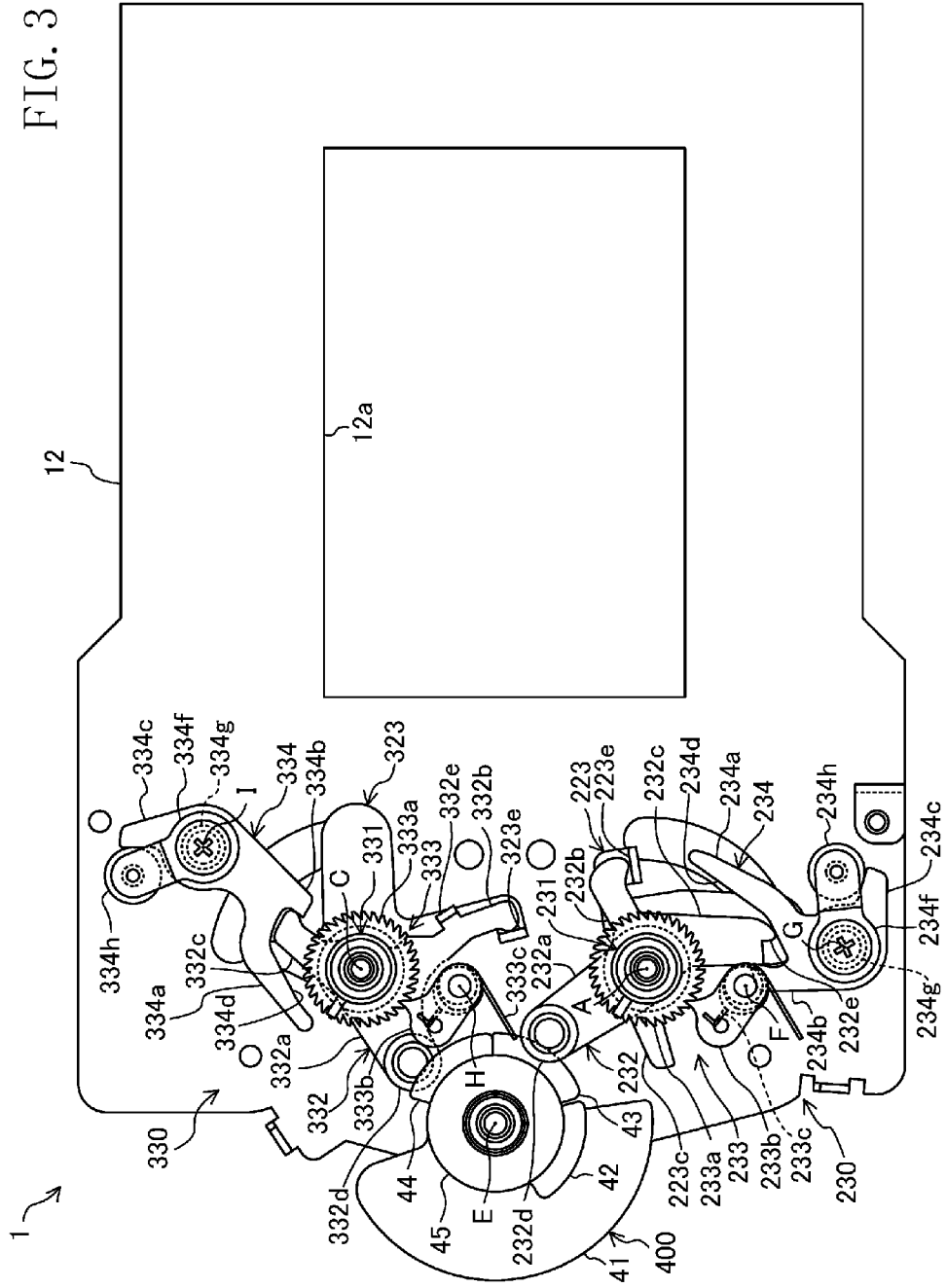
FIG. 3 is a back view of the shutter device mainly illustrating a leading charge mechanism and a trailing charge mechanism in the state in which some components are not shown.
Figure 4:
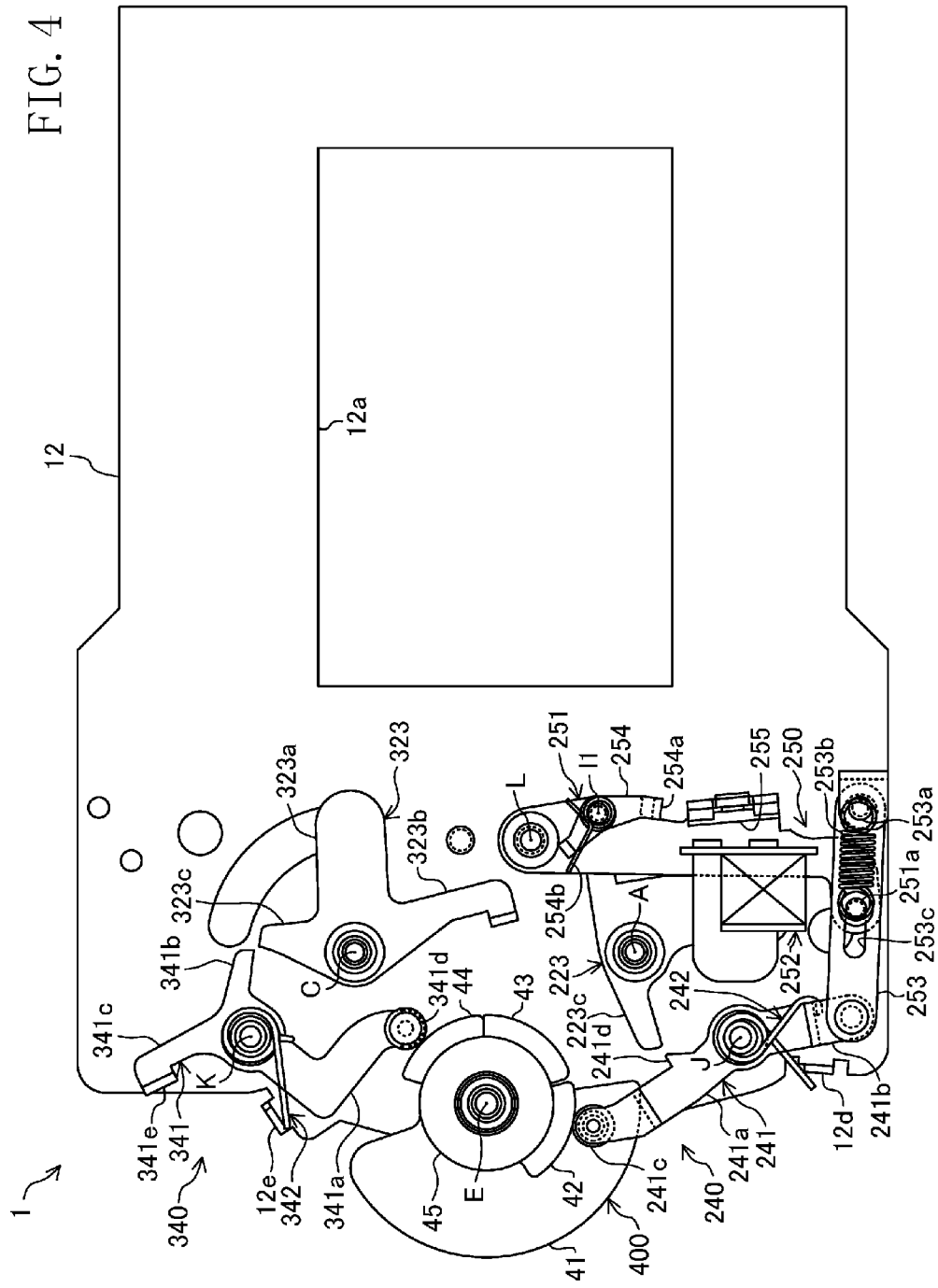
FIG. 4 is a back view of the shutter device mainly illustrating a leading arm lock mechanism and a trailing arm lock mechanism in the state in which some components are not shown.
Figure 5:
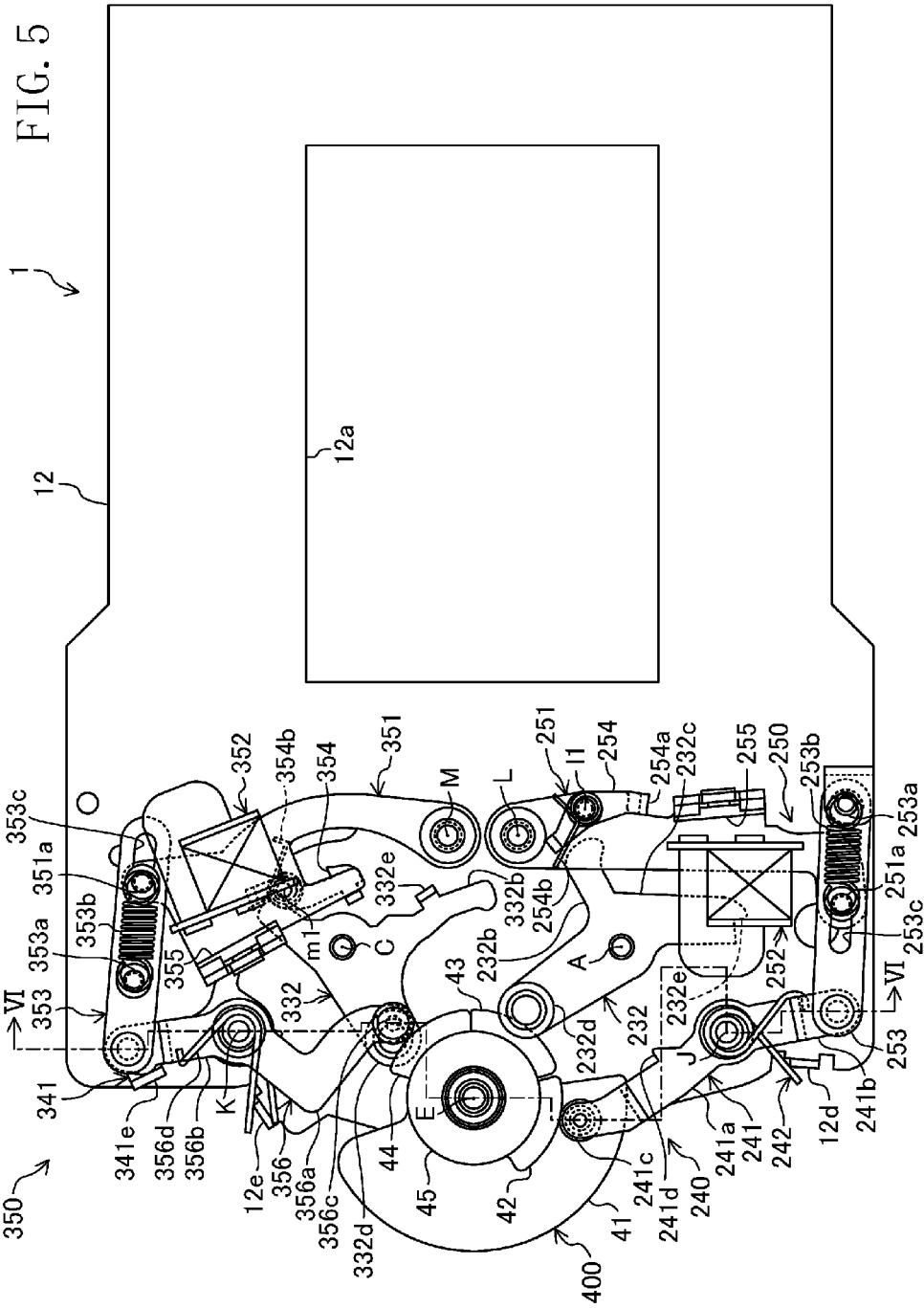
FIG. 5 is a back view of the shutter device mainly illustrating a leading charge maintaining mechanism and a trailing charge maintaining mechanism in the state in which some components are not shown.
Figure 6:
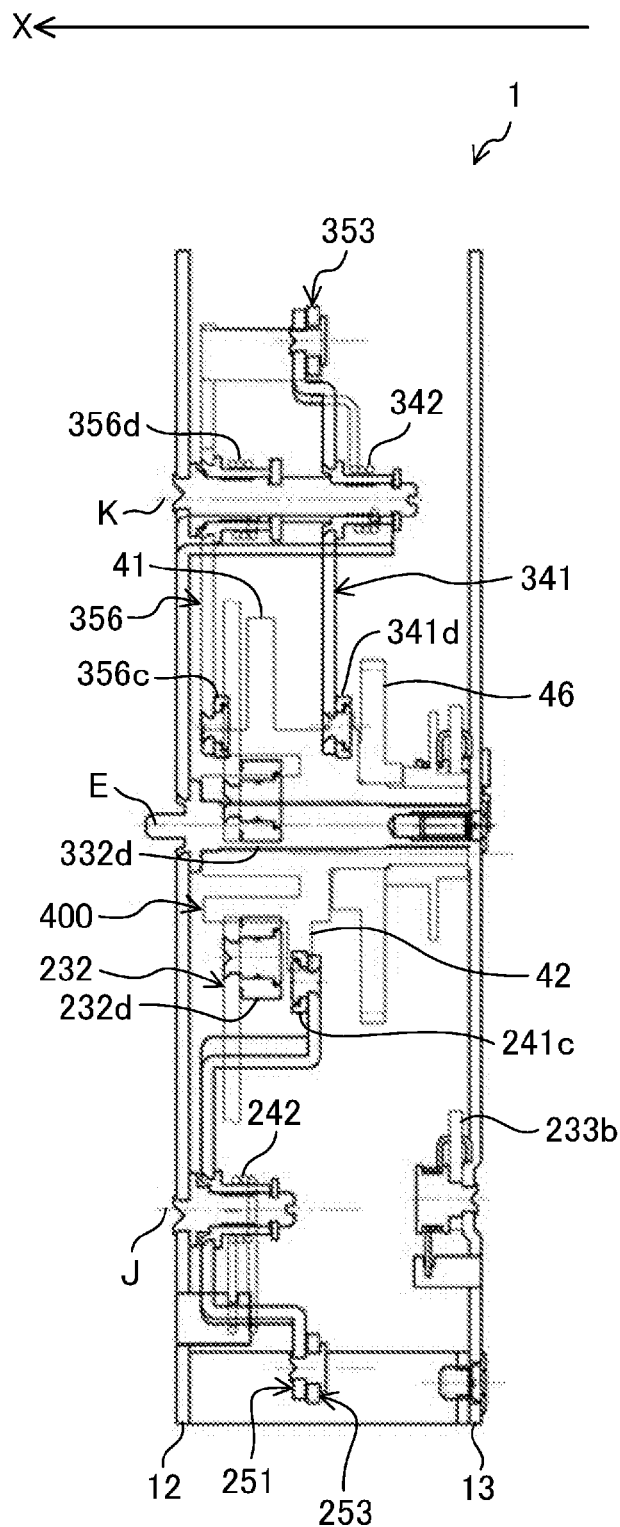
FIG. 6 is a cross-sectional view of the shutter device along an IV-IV line of FIG. 5.

FIG. 1 is a back view of a shutter device 1 (a third base plate 13 is not shown). FIG. 2 is a cross-sectional view of the shutter device 1 along an II-II line of FIG. 1. FIG. 3 is a back view of the shutter device 1 mainly illustrating a leading charge mechanism 230 and a trailing charge mechanism 330 in the state in which some components are not shown. FIG. 4 is a back view of the shutter device 1 mainly illustrating a leading arm lock mechanism 240 and a trailing arm lock mechanism 340 in the state in which some components are not shown. FIG. 5 is a back view of the shutter device 1 mainly illustrating a leading charge maintaining mechanism 250 and a trailing charge maintaining mechanism 350 in the state in which some components are not shown. FIG. 6 is a cross-sectional view of the shutter device 1 along an IV-IV line of FIG. 5.

The shutter device 1 includes a base plate unit 100, a leading-curtain unit 200, a trailing-curtain unit 300, and a drive cam mechanism 400.

Referring to FIG. 2, the base plate unit 100 includes a first base plate 11, a second base plate 12, and the third base plate 13. The first base plate 11, the second base plate 12, and the third base plate 13 are arranged at predetermined intervals in an X-axis direction so as to face each other. The second base plate 12 is disposed between the first base plate 11 and the third base plate 13. A substantially rectangular opening is formed in each of the first base plate 11 and the second base plate 12. As viewed in the X-axis direction, the opening 11a of the first base plate 11 and the opening 12a of the second base plate 12 overlap with each other. A blade chamber R is formed between the first base plate 11 and the second base plate 12.

The shutter device 1 is mounted in a camera such that the first base plate 11 is on a lens barrel side and that the third base plate 13 is on an imaging element side. For the sake of simplicity of description, a side close to the first base plate 11 in the X-axis direction is hereinafter referred to as "front," and a side close to the third base plate 13 in the X-axis direction is hereinafter referred to as "back."

The leading-curtain unit 200 includes a leading blade group 210, a leading drive arm 221, a leading driven arm 222, a leading drive lever 223, the leading charge mechanism 230, the leading arm lock mechanism 240, and the leading charge maintaining mechanism 250. Note that the names of components of the leading-curtain unit 200 are preceded by "leading."

The trailing-curtain unit 300 includes a trailing blade group 310, a trailing drive arm 321, a trailing driven arm 322, a trailing drive lever 323, the trailing charge mechanism 330, the trailing arm lock mechanism 340, and the trailing charge maintaining mechanism 350. Note that the names of components of the trailing-curtain unit 300 are preceded by "trailing."

[2. Drive Arm and Blade Group]

[2-1. Leading-Curtain Unit]

The leading drive arm 221 is supported between the first base plate 11 and the second base plate 12 so as to rotate about a rotation axis A. The rotation axis A extends parallel to an X-axis. Rotation axes B-M, 11, m1 as described later also extend parallel to the X-axis.

The leading drive lever 223 is supported between the second base plate 12 and the third base plate 13 so as to rotate about the rotation axis A. Referring to FIG. 1, the leading drive lever 223 includes a first arm 223a, a second arm 223b, and a third arm 223c. A connection pin 223d extending toward the leading drive arm 221 is provided at a tip end part of the first arm 223a. The connection pin 223d penetrates an arc-shaped first long hole 12b formed in the second base plate 12, and is connected to the leading drive arm 221. That is, the leading drive arm 221 rotates integrally with the leading drive lever 223. A tip end part of the second arm 223b is bent so as to extend toward the back, and forms a contact part 223e. A second arm 232b of a leading charge lever 232 described later contacts the contact part 223e. A lock part 241d of a leading hold lever 241 described later engages with the third arm 223c. The leading drive lever 223 is an example of a leading drive member.

The leading driven arm 222 is supported between the first base plate 11 and the second base plate 12 so as to rotate about the rotation axis B.

The leading blade group 210 includes first to fourth leading blades 21a-21d. Note that the first to fourth leading blades 21a-21d are sometimes simply referred to as "leading blades 21" or a "leading blade 21" without distinction. Each leading blade 21 is rotatably connected to the leading drive arm 221 and the leading driven arm 222. The first leading blade 21a, the second leading blade 21b, the third leading blade 21c, and the fourth leading blade 21d are connected to each of the leading drive arm 221 and the leading driven arm 222 in this order from a tip end thereof.

The leading drive arm 221, the leading driven arm 222, and the leading blade group 210 form a mechanical linkage. When the leading drive arm 221 rotates, the leading blade group 210 rotates accordingly. Since the leading blade group 210 is also connected to the leading driven arm 222, the leading driven arm 222 rotates about the rotation axis B to move the leading blade group 210 in a Y-axis direction perpendicular to the X-axis direction. In FIG. 1, when the leading drive arm 221 has rotated clockwise (hereinafter referred to as an "opening direction"), the leading blades 21 of the leading blade group 210 overlap with each other at the position (hereinafter referred to as an "open position") outside the openings 11a, 12a, thereby bringing about the state (hereinafter referred to as an "open state") in which the openings 11a, 12a are not covered, i.e., the openings 11a, 12a are opened. On the other hand, when the leading drive arm 221 has rotated counterclockwise (hereinafter referred to as a "closing direction"), the leading blades 21 of the leading blade group 210 overlapping with each other at the open position spread out to cover the openings 11a, 12a (this state is hereinafter referred to as a "closed state," and this position is hereinafter referred to as a "closed position"). A rotation direction of the leading driven arm 222 corresponding to the opening direction of the leading drive arm 221 is also hereinafter referred to as an "opening direction," and another rotation direction of the leading driven arm 222 corresponding to the closing direction of the leading drive arm 221 is also hereinafter referred to as a "closing direction." Moreover, a rotation direction of the leading drive lever 223 corresponding to the opening direction of the leading drive arm 221 is also hereinafter referred to as an "opening direction," and another rotation direction of the leading drive lever 223 corresponding to the closing direction of the leading drive arm 221 is also hereinafter referred to as a "closing direction."

The leading driven arm 222 is, by a leading set spring 224, biased in the closing direction, i.e., the direction in which the leading blade group 210 moves to the closed position.

[2-2. Trailing-Curtain Unit]

The trailing drive arm 321 is supported between the first base plate 11 and the second base plate 12 so as to rotate about the rotation axis C.

The trailing drive lever 323 is supported between the second base plate 12 and the third base plate 13 so as to rotate about the rotation axis C. Referring to FIG. 1, the trailing drive lever 323 includes a first arm 323a, a second arm 323b, and a third arm 323c. A connection pin 323d extending toward the trailing drive arm 321 is provided at a tip end part of the first arm 323a. The connection pin 323d penetrates an arc-shaped second long hole 12c formed in the second base plate 12, and is connected to the trailing drive arm 321. That is, the trailing drive arm 321 rotates integrally with the trailing drive lever 323. A tip end part of the second arm 323b is bent so as to extend toward the back, and forms a contact part 323e. A second arm 332b of a trailing charge lever 332 described later contacts the contact part 323e. A second arm 341b of a trailing hold lever 341 described later engages with the third arm 323c. The trailing drive lever 323 is an example of a trailing drive member.

The trailing driven arm 322 is supported between the first base plate 11 and the second base plate 12 so as to rotate about the rotation axis D.

The trailing blade group 310 includes first to fourth trailing blades 31a-31d. Note that the first to fourth trailing blades 31a-31d are sometimes simply referred to as "trailing blades 31" or a "trailing blade 31" without distinction. Each trailing blade 31 is rotatably connected to the trailing drive arm 321 and the trailing driven arm 322. The first trailing blade 31a, the second trailing blade 31b, the third trailing blade 31c, and the fourth trailing blade 31d are connected to each of the trailing drive arm 321 and the trailing driven arm 322 in this order from a tip end thereof.

The trailing drive arm 321, the trailing driven arm 322, and the trailing blade group 310 form a mechanical linkage. When the trailing drive arm 321 rotates, the trailing blade group 310 rotates accordingly. Since the trailing blade group 310 is also connected to the trailing driven arm 322, the trailing driven arm 322 rotates about the rotation axis D to move the trailing blade group 310 in the Y-axis direction. In FIG. 1, when the trailing drive arm 321 has rotated counterclockwise (hereinafter referred to as an "opening direction"), the trailing blades 31 of the trailing blade group 310 overlap with each other at the position (hereinafter referred to as an "open position") outside the openings 11a, 12a, thereby bringing about the state (hereinafter referred to as an "open state") in which the openings 11a, 12a are not covered, i.e., the openings 11a, 12a are opened. On the other hand, when the trailing drive arm 321 has rotated clockwise (hereinafter referred to as a "closing direction"), the trailing blades 31 of the trailing blade group 310 overlapping with each other at the open position spread out to cover the openings 11a, 12a (this state is hereinafter referred to as a "closed state," and this position is hereinafter referred to as a "closed position"). A rotation direction of the trailing driven arm 322 corresponding to the opening direction of the trailing drive arm 321 is also hereinafter referred to as an "opening direction," and another rotation direction of the trailing driven arm 322 corresponding to the closing direction of the trailing drive arm 321 is also hereinafter referred to as a "closing direction." Moreover, a rotation direction of the trailing drive lever 323 corresponding to the opening direction of the trailing drive arm 321 is also hereinafter referred to as an "opening direction," and another rotation direction of the trailing drive lever 323 corresponding to the closing direction of the trailing drive arm 321 is also hereinafter referred to as a "closing direction."

The trailing driven arm 322 is, by a trailing set spring 324, biased in the opening direction, i.e., the direction in which the trailing blade group 310 moves to the open position.

[3. Drive Cam]

The drive cam mechanism 400 includes a cylindrical part 45, first to fourth cam parts 41-44 provided at the outer periphery of the cylindrical part 45, a gear 46 provided at the outer periphery of the cylindrical part 45, a not-shown gear train, and a not-shown drive motor. The drive cam mechanism 400 is supported between the second base plate 12 and the third base plate 13 so as to rotate about the rotation axis E. The center of the cylindrical part 45 is coincident with the rotation axis E. The gear 46 is connected to the drive motor through the gear train. The drive cam mechanism 400 is rotatably driven by the drive motor through the gear 46 and the gear train. The drive cam mechanism 400 is rotatably driven in one direction (i.e., clockwise as viewed in FIG. 3) about the rotation axis E. The leading-curtain unit 200 and the trailing-curtain unit 300 share the drive cam mechanism 400. That is, the leading-curtain unit 200 and the trailing-curtain unit 300 are driven by the same drive cam mechanism 400. The drive cam mechanism 400 is an example of a leading cam mechanism, and is also an example of a trailing cam mechanism.

Each cam part 41-44 is in a fan shape having a predetermined outer diameter, and is provided at a predetermined angular position at the outer periphery of the cylindrical part 45. Corner parts of each cam part 41-44 are formed in an R-shape. Specifically, the first cam part 41 has the largest outer size, and is provided within an area of about 180° about the rotation axis E. The second to fourth cam parts 42-44 are smaller than the first cam part 41, and have the substantially same outer size. As viewed in the X-axis direction, the second cam part 42 is provided on the back side relative to the first cam part 41. The second cam part 42 is provided so as to overlap with a tail end part of the first cam part 41 in the rotation direction of the drive cam mechanism 400. The third cam part 43 is provided on the front side relative to the first cam part 41, and is provided on a tail end side of the second cam part 42 in the rotation direction of the drive cam mechanism 400. The fourth cam part 44 is provided on the back side relative to the second cam part 42, and is provided on a tail end side of the third cam part 43 in the rotation direction of the drive cam mechanism 400. The first cam part 41 is an example of a leading charge cam part and a trailing charge cam part. That is, the first cam part 41 forms both of the leading charge cam part and the trailing charge cam part. The second cam part 42 is an example of a leading biasing cam part. The third cam part 43 is an example of a trailing release cam part. The fourth cam part 44 is an example of a trailing biasing cam part.

[4. Charge Mechanism]

The leading charge mechanism 230 and the trailing charge mechanism 330 are driven by the drive cam mechanism 400.

[4-1. Leading-Curtain Unit]

Referring to FIG. 3, the leading charge mechanism 230 includes a leading drive spring 231 configured to generate force for biasing the leading drive arm 221, the leading charge lever 232 configured to elastically deform the leading drive spring 231, a ratchet mechanism 233 configured to hold an end part of the leading drive spring 231, and a brake lever 234 configured to put a brake on the leading charge lever 232.

The leading drive spring 231 is a coil spring, and is, between the second base plate 12 and the third base plate 13, winded around a shaft 231a. The center of the shaft 231a is coincident with the rotation axis A. One end part of the leading drive spring 231 is connected to the leading charge lever 232. The other end part of the leading drive spring 231 is connected to the ratchet mechanism 233.

The leading charge lever 232 is supported by the second base plate 12 and the third base plate 13 so as to rotate about the rotation axis A. Since the end part of the leading drive spring 231 is connected to the leading charge lever 232, the leading drive spring 231 is, upon rotation of the leading charge lever 232 about the rotation axis A, winded up to generate elastic force about the rotation axis A. Such elastic force acts as force for biasing the leading drive arm 221. Since elastic force of the leading drive spring 231 is much greater than elastic force of the leading set spring 224 of the leading driven arm 222, the leading charge lever 232 is, upon release of elastic force of the leading drive spring 231, rotated about the rotation axis A by elastic force of the leading drive spring 231. In terms of the rotation direction about the rotation axis A, the direction in which the leading drive spring 231 is winded up is hereinafter referred to as a "charge direction," and the direction in which elastic force of the leading drive spring 231 is released is hereinafter referred to as a "drive direction." The leading charge lever 232 is an example of a leading charge member.

The leading charge lever 232 includes a first arm 232a, the second arm 232b, and a third arm 232c. At a tip end of the first arm 232a, a roller 232d is rotatably supported. The position of the roller 232d in the X-axis direction is the same as the position of the first cam part 41 of the drive cam mechanism 400 in the X-axis direction. The position of the second arm 232b in the X-axis direction is the same as the position of the contact part 223e of the leading drive lever 223 in the X-axis direction. A tip end part of the second arm 232b contacts the contact part 223e when the leading charge lever 232 rotates. An engagement part 232e to be engaged with a leading lock lever 251 described later is provided at a tip end part of the third arm 232c.

The ratchet mechanism 233 includes a ratchet ring 233a, a ratchet pawl 233b configured to restrict rotation of the ratchet ring 233a, and a biasing spring 233c configured to bias the ratchet pawl 233b. The ratchet ring 233a is supported by the third base plate 13 so as to rotate about the rotation axis A. The end part of the leading drive spring 231 is connected to the ratchet ring 233a. A plurality of teeth are provided on an outer circumferential surface of the ratchet ring 233a. The ratchet pawl 233b is supported by the third base plate 13 so as to rotate about the rotation axis F. The ratchet pawl 233b is, by the biasing spring 233c, biased about the rotation axis F in the direction in which the ratchet pawl 233b engages with the teeth of the ratchet ring 233a. The ratchet pawl 233b engages with the teeth of the ratchet ring 233a to restrict rotation of the ratchet ring 233a, thereby determining the angular position of the ratchet ring 233a about the rotation axis A. Determination of the angular position of the ratchet ring 233a about the rotation axis A also determines the angular position of the end part of the leading drive spring 231 about the rotation axis A.

The brake lever 234 is supported by the second base plate 12 through a hold part 234f so as to rotate about the rotation axis G. The brake lever 234 includes a first arm 234a, a second arm 234b, and a third arm 234c. A sliding surface 234d on which the third arm 232c slides during rotation of the leading charge lever 232 is formed at the first arm 234a. The third arm 232c contacts the second arm 234b when the leading charge lever 232 rotates in the drive direction. The brake lever 234 is sandwiched between the hold part 234f and the second base plate 12. In such a state, a wave washer 234g is interposed between the hold part 234f and the brake lever 234. The wave washer 234g functions to provide rotation resistance during rotation of the brake lever 234. A rubber stopper 234h is provided at the hold part 234f. The second arm 234b is pushed by the third arm 232c of the leading charge lever 232 to rotate the brake lever 234 about the rotation axis G, and the third arm 234c of the brake lever 234 eventually comes into contact with the stopper 234h. In this manner, rotation of the brake lever 234 is restricted. Note that the wave washer 234g may be made of metal, but may be made of a material other than metal as long as proper rotation resistance can be provided to the brake lever 234. Moreover, as long as proper rotation resistance can be provided to the brake lever 234, a member other than the wave washer 234g may be provided at the brake lever 234.

In the leading charge mechanism 230 configured as described above, when the leading charge lever 232 has rotated to the maximum extent possible in the drive direction by biasing force of the leading drive spring 231, the leading charge lever 232 stops with the leading charge lever 232 contacting the brake lever 234. The roller 232d of the leading charge lever 232 is positioned on the track of rotation of the first cam part 41 of the drive cam mechanism 400. When the drive cam mechanism 400 rotates, in this state, to cause the first cam part 41 to contact the roller 232d, the leading charge lever 232 rotates about the rotation axis A such that the roller 232d moves over an outer circumferential surface of the first cam part 41. As a result, the leading charge lever 232 winds up the leading drive spring 231, i.e., charges the leading drive spring 231. Then, biasing force is generated at the leading drive spring 231. In this state, the third arm 232c of the leading charge lever 232 slides on the sliding surface 234d of the brake lever 234. Thus, the brake lever 234 rotates about the rotation axis G in combination with rotation of the leading charge lever 232. As a result, the third arm 234c of the brake lever 234 moves away from the stopper 234h.

The leading charge lever 232 is held by the leading charge maintaining mechanism 250 with the leading drive spring 231 being winded up. Holding of the leading charge lever 232 by the leading charge maintaining mechanism 250 will be described later. In this state, even if the first cam part 41 does not contact the roller 232d, the leading charge lever 232 is held with the leading drive spring 231 being winded up.

When the leading charge lever 232 is released from the leading charge maintaining mechanism 250, the leading charge lever 232 rotates in the drive direction by biasing force of the leading drive spring 231. When the leading charge lever 232 rotates in the drive direction, the second arm 232b of the leading charge lever 232 pushes the contact part 223e of the leading drive lever 223 to rotate the leading drive lever 223 in the opening direction. Accordingly, the leading drive arm 221 and the leading driven arm 222 rotate in the opening direction, and the leading blade group 210 moves to the open position. In this state, the second arm 234b of the brake lever 234 is positioned on the track of rotation of the third arm 232c of the leading charge lever 232. Thus, the third arm 232c of the leading charge lever 232 comes into contact with the second arm 234b of the brake lever 234. Although the brake lever 234 rotates about the rotation axis G due to contact between the leading charge lever 232 and the brake lever 234, rotation resistance of the wave washer 234g puts a brake on rotation of the leading charge lever 232. Thus, rotation of the leading charge lever 232 gradually becomes slower. Eventually, since the third arm 234c of the brake lever 234 comes into contact with the stopper 234h, rotation of the brake lever 234 is stopped, and rotation of the leading charge lever 232 is also stopped.

Note that the amount of winding-up of the leading drive spring 231 by rotation of the leading charge lever 232, i.e., elastic force of the leading drive spring 231, is adjusted by the angular position of the ratchet ring 233a about the rotation axis A.

[4-2. Trailing-Curtain Unit]

Referring to FIG. 3, the trailing charge mechanism 330 includes a trailing drive spring 331 configured to generate force for biasing the trailing drive arm 321, the trailing charge lever 332 configured to elastically deform the trailing drive spring 331, a ratchet mechanism 333 configured to hold an end part of the trailing drive spring 331, and a brake lever 334 configured to put a brake on the trailing charge lever 332.

The trailing drive spring 331 is a coil spring, and is, between the second base plate 12 and the third base plate 13, winded around a shaft 331a. The center of the shaft 331a is coincident with the rotation axis C. One end part of the trailing drive spring 331 is connected to the trailing charge lever 332. The other end part of the trailing drive spring 331 is connected to the ratchet mechanism 333.

The trailing charge lever 332 is supported by the second base plate 12 and the third base plate 13 so as to rotate about the rotation axis C. Since the end part of the trailing drive spring 331 is connected to the trailing charge lever 332, the trailing drive spring 331 is, upon rotation of the trailing charge lever 332 about the rotation axis C, winded up to generate elastic force about the rotation axis C. Such elastic force acts as force for biasing the trailing drive arm 321. Since elastic force of the trailing drive spring 331 is much greater than elastic force of the trailing set spring 324 of the trailing driven arm 322, the trailing charge lever 332 is, upon release of elastic force of the trailing drive spring 331, rotated about the rotation axis C by elastic force of the trailing drive spring 331. In terms of the rotation direction about the rotation axis C, the direction in which the trailing drive spring 331 is winded up is hereinafter referred to as a "charge direction," and the direction in which elastic force of the trailing drive spring 331 is released is hereinafter referred to as a "drive direction."

The trailing charge lever 332 includes a first arm 332a, the second arm 332b, and a third arm 332c. At a tip end of the first arm 332a, a roller 332d is rotatably supported. The position of the roller 332d in the X-axis direction is the same as the position of the first cam part 41 of the drive cam mechanism 400 in the X-axis direction. The position of the second arm 332b in the X-axis direction is the same as the position of the contact part 323e of the trailing drive lever 323 in the X-axis direction. A tip end part of the second arm 332b contacts the contact part 323e when the trailing charge lever 332 rotates. An engagement part 332e to be engaged with a trailing lock lever 351 described later is provided at the second arm 332b. The engagement part 332e is bent from the second arm 332b so as to extend toward the back. The third arm 332c engages with the brake lever 334.

The ratchet mechanism 333 includes a ratchet ring 333a, a ratchet pawl 333b configured to restrict rotation of the ratchet ring 333a, and a biasing spring 333c configured to bias the ratchet pawl 333b. The ratchet ring 333a is supported by the third base plate 13 so as to rotate about the rotation axis C. The end part of the trailing drive spring 331 is connected to the ratchet ring 333a. A plurality of teeth are provided on an outer circumferential surface of the ratchet ring 333a. The ratchet pawl 333b is supported by the third base plate 13 so as to rotate about the rotation axis H. The ratchet pawl 333b is, by the biasing spring 333c, biased about the rotation axis H in the direction in which the ratchet pawl 333b engages with the teeth of the ratchet ring 333a. The ratchet pawl 333b engages with the teeth of the ratchet ring 333a to restrict rotation of the ratchet ring 333a, thereby determining the angular position of the ratchet ring 333a about the rotation axis C. Determination of the angular position of the ratchet ring 333a about the rotation axis C also determines the angular position of the end part of the trailing drive spring 331 about the rotation axis C.

The brake lever 334 is supported by the second base plate 12 through a hold part 334f so as to rotate about the rotation axis I. The brake lever 334 includes a first arm 334a, a second arm 334b, and a third arm 334c. A sliding surface 334d on which the third arm 332c slides during rotation of the trailing charge lever 332 is formed at the first arm 334a. The third arm 332c contacts the second arm 334b when the trailing charge lever 332 rotates in the drive direction. The brake lever 334 is sandwiched between the hold part 334f and the second base plate 12. In such a state, a wave washer 334g is interposed between the hold part 334f and the brake lever 334. The wave washer 334g functions to provide rotation resistance during rotation of the brake lever 334. A rubber stopper 334h is provided at the hold part 334f. The second arm 334b is pushed by the third arm 332c of the trailing charge lever 332 to rotate the brake lever 334 about the rotation axis I, and the third arm 334c of the brake lever 334 eventually comes into contact with the stopper 334h. In this manner, rotation of the brake lever 334 is restricted. Note that the wave washer 334g may be made of metal, but may be made of a material other than metal as long as proper rotation resistance can be provided to the brake lever 334. Moreover, as long as proper rotation resistance can be provided to the brake lever 334, a member other than the wave washer 334g may be provided at the brake lever 334.

In the trailing charge mechanism 330 configured as described above, when the trailing charge lever 332 has rotated to the maximum extent possible in the drive direction by biasing force of the trailing drive spring 331, the trailing charge lever 332 stops with the trailing charge lever 332 contacting the brake lever 334. The roller 332d of the trailing charge lever 332 is positioned on the track of rotation of the first cam part 41 of the drive cam mechanism 400. When the drive cam mechanism 400 rotates, in this state, to cause the first cam part 41 to contact the roller 332d, the trailing charge lever 332 rotates about the rotation axis C such that the roller 332d moves over the outer circumferential surface of the first cam part 41. As a result, the trailing charge lever 332 winds up the trailing drive spring 331, i.e., charges the trailing drive spring 331. Then, biasing force is generated at the trailing drive spring 331. In this state, the third arm 332c of the trailing charge lever 332 slides on the sliding surface 334d of the brake lever 334. Thus, the brake lever 334 rotates about the rotation axis I in combination with rotation of the trailing charge lever 332. As a result, the third arm 334c of the brake lever 334 moves away from the stopper 334h.

The trailing charge lever 332 is held by the trailing charge maintaining mechanism 350 with the trailing drive spring 331 being winded up. Holding of the trailing charge lever 332 by the trailing charge maintaining mechanism 350 will be described later. In this state, even if the first cam part 41 does not contact the roller 332d, the trailing charge lever 332 is held with the trailing drive spring 331 being winded up.

When the trailing charge lever 332 is released from the trailing charge maintaining mechanism 350, the trailing charge lever 332 rotates in the drive direction by biasing force of the trailing drive spring 331. When the trailing charge lever 332 rotates in the drive direction, the second arm 332b of the trailing charge lever 332 pushes the contact part 323e of the trailing drive lever 323 to rotate the trailing drive lever 323 in the closing direction. Accordingly, the trailing drive arm 321 and the trailing driven arm 322 rotate in the closing direction, and the trailing blade group 310 moves to the closed position. In this state, the second arm 334b of the brake lever 334 is positioned on the track of rotation of the third arm 332c of the trailing charge lever 332. Thus, the third arm 332c of the trailing charge lever 332 comes into contact with the second arm 334b of the brake lever 334. Although the brake lever 334 rotates about the rotation axis I due to contact between the trailing charge lever 332 and the brake lever 334, rotation resistance of the wave washer 334g puts a brake on rotation of the trailing charge lever 332. Thus, rotation of the trailing charge lever 332 gradually becomes slower. Eventually, since the third arm 334c of the brake lever 334 comes into contact with the stopper 334h, rotation of the brake lever 334 is stopped, and rotation of the trailing charge lever 332 is also stopped.

Note that the amount of winding-up of the trailing drive spring 331 by rotation of the trailing charge lever 332, i.e., elastic force of the trailing drive spring 331, is adjusted by the angular position of the ratchet ring 333a about the rotation axis C.

[5. Arm Lock Mechanism]

The leading arm lock mechanism 240 and the trailing arm lock mechanism 340 are driven by the drive cam mechanism 400.

[5-1. Leading-Curtain Unit]

Referring to FIG. 4, the leading arm lock mechanism 240 includes the leading hold lever 241 and a biasing spring 242 configured to bias the leading hold lever 241.

The leading hold lever 241 is supported so as to rotate about the rotation axis J. The leading hold lever 241 includes a first arm 241a and a second arm 241b. The leading hold lever 241 is an example of a second leading hold member.

A roller 241c is rotatably provided at a tip end of the first arm 241a. The position of the roller 241c in the X-axis direction is the same as the position of the second cam part 42 of the drive cam mechanism 400 in the X-axis direction. The lock part 241d is provided at the first arm 241a so as to protrude from the first arm 241a. Although will be described in detail later, the lock part 241d locks the leading drive lever 223.

A tip end part of the second arm 241b is connected to a later-described leading biasing lever 253 of the leading charge maintaining mechanism 250.

The biasing spring 242 is winded about the rotation axis J, and biases the leading hold lever 241 in one direction (clockwise as viewed in the figure) about the rotation axis J. A first stopper 12d configured to limit the range of rotation of the leading hold lever 241 is provided at the second base plate 12. The leading hold lever 241 rotates about the rotation axis J by biasing force of the biasing spring 242, and stops at such a position that the second arm 241b contacts the first stopper 12d.

When the leading hold lever 241 is at such a position that the second arm 241b contacts the first stopper 12d, the lock part 241d is positioned on the track of rotation of the third arm 223c of the leading drive lever 223. Such a position of the leading hold lever 241 is hereinafter referred to as a "hold position." When the leading hold lever 241 is at the hold position, rotation of the third arm 223c of the leading drive lever 223 in the closing direction is locked by the lock part 241d. In this manner, the leading hold lever 241 holds the leading drive lever 223.

When the leading hold lever 241 is at the hold position, the roller 241c is positioned on the track of rotation of the second cam part 42. When the drive cam mechanism 400 rotates, in this state, to cause the second cam part 42 to contact the roller 241c, the leading hold lever 241 rotates about the rotation axis J in the direction opposite to a biasing direction of the biasing spring 242 such that the roller 241c moves over an outer circumferential surface of the second cam part 42. Accordingly, the lock part 241d moves so as to deviate from the track of rotation of the third arm 223c. As a result, the leading drive lever 223 is released from the leading hold lever 241. Such a position of the leading hold lever 241 is hereinafter referred to as a "release position."

[5-2. Trailing-Curtain Unit]

Referring to FIG. 4, the trailing arm lock mechanism 340 includes the trailing hold lever 341 and a biasing spring 342 configured to bias the trailing hold lever 341.

The trailing hold lever 341 is supported so as to rotate about the rotation axis K. The trailing hold lever 341 includes a first arm 341a, the second arm 341b, and a third arm 341c. The trailing hold lever 341 is an example of a second trailing hold member.

A roller 341d is rotatably provided at a tip end of the first arm 341a. The position of the roller 341d in the X-axis direction is the same as the position of the third cam part 43 of the drive cam mechanism 400 in the X-axis direction.

Although will be described in detail later, a tip end part of the second arm 341b locks the trailing drive lever 323.

A tip end part of the third arm 341c is bent so as to extend toward the back, and forms a contact part 341e. A second arm 356b of a transmission lever 356 described later contacts the contact part 341e.

The biasing spring 342 is winded about the rotation axis K, and biases the trailing hold lever 341 in one direction (clockwise as viewed in the figure) about the rotation axis K. A second stopper 12e configured to limit the range of rotation of the trailing hold lever 341 is provided at the second base plate 12. That is, the trailing hold lever 341 is biased by the biasing spring 342 to rotate about the rotation axis K to the position at which the trailing hold lever 341 contacts the second stopper 12e.

When the trailing hold lever 341 is at such a position that the trailing hold lever 341 contacts the second stopper 12e, the tip end part of the second arm 341b is positioned on the track of rotation of the third arm 323c of the trailing drive lever 323.

Such a position of the trailing hold lever 341 is hereinafter referred to as a "hold position." When the trailing hold lever 341 is at the hold position, rotation of the third arm 323c of the trailing drive lever 323 in the opening direction is locked by the second arm 341b. In this manner, the trailing hold lever 341 holds the trailing drive lever 323.

When the trailing hold lever 341 is at the hold position, the roller 341d is positioned on the track of rotation of the third cam part 43. When the drive cam mechanism 400 rotates, in this state, to cause the third cam part 43 to contact the roller 341d, the trailing hold lever 341 rotates about the rotation axis K in the direction opposite to a biasing direction of the biasing spring 342 such that the roller 341d moves over an outer circumferential surface of the third cam part 43. Accordingly, the second arm 341b moves so as to deviate from the track of rotation of the third arm 323c. As a result, the trailing drive lever 323 is released from the trailing hold lever 341. Such a position of the trailing hold lever 341 is hereinafter referred to as a "release position."

[6. Charge Maintaining Mechanism]

The leading charge maintaining mechanism 250 and the trailing charge maintaining mechanism 350 are driven by the drive cam mechanism 400.

[6-1. Leading-Curtain Unit]

The leading charge maintaining mechanism 250 includes the leading lock lever 251 configured to lock the leading charge lever 232, a leading attractive unit 252 configured to hold the leading lock lever 251 at a later-described lock position, and the leading biasing lever 253 configured to bias the leading lock lever 251 in a release direction in which the leading lock lever 251 moves away from the lock position.

The leading lock lever 251 is, at one end part thereof, supported so as to rotate the rotation axis L. A connection pin 251a is provided at the other end part of the leading lock lever 251. The connection pin 251a is connected to the leading biasing lever 253.

A lock piece 254 is provided at the leading lock lever 251. The lock piece 254 is supported by the leading lock lever 251 so as to rotate about the rotation axis 11. A tip end part of the lock piece 254 is bent so as to extend toward the front. A lock part 254a is provided at the part of the lock piece 254 extending toward the front. The position of the lock part 254a in the X-axis direction is the same as the position of the engagement part 232e of the leading charge lever 232 in the X-axis direction. The lock piece 254 is, by a biasing spring 254b, biased in one direction (clockwise as viewed in the figure) about the rotation axis 11. The lock piece 254 biased in one direction about the rotation axis 11 stops at such a position that the lock part 254a contacts the leading lock lever 251. Such a position of the lock piece 254 is hereinafter referred to as the "lock position." The leading lock lever 251 is an example of a leading lock member.

An attractive piece 255 is provided at the leading lock lever 251. The attractive piece 255 is made of permalloy.

The leading lock lever 251 is configured to rotate about the rotation axis L to move between the lock position at which the lock part 254a is positioned on the track of rotation of the engagement part 232e of the leading charge lever 232 and the release position at which the lock part 254a is positioned out of the track of rotation of the engagement part 232e of the leading charge lever 232. When the leading lock lever 251 is at the lock position, the attractive piece 255 contacts the leading attractive unit 252. On the other hand, when the leading lock lever 251 is at the release position, the attractive piece 255 is apart from the leading attractive unit 252.

The leading attractive unit 252 includes an electric magnet. When the leading lock lever 251 is at the lock position, the leading attractive unit 252 energizes the electric magnet to attract the attractive piece 255. In this manner, the leading attractive unit 252 holds, by electromagnetic force, the leading lock lever 251 at the lock position. The leading attractive unit 252 is an example of a first leading hold member.

One end part of the leading biasing lever 253 is rotatably connected to the second arm 241b of the leading hold lever 241. A connection pin 253a is provided at the other end part of the leading biasing lever 253. A long hole 253c is formed so as to penetrate a middle part of the leading biasing lever 253. The connection pin 251a of the leading lock lever 251 is inserted into the long hole 253c. In this manner, the leading biasing lever 253 is connected to the leading lock lever 251 through the long hole 253c and the connection pin 251a. In the long hole 253c, the connection pin 251a is movable in a longitudinal direction of the long hole 253c. One end part of a biasing spring 253b is connected to the connection pin 253a, and the other end part of the biasing spring 253b is connected to the connection pin 251a. That is, the connection pin 251a is, by the biasing spring 253b, biased toward the connection pin 253a in the long hole 253c. The leading hold lever 241, the leading biasing lever 253, and the biasing spring 253b are an example of a leading biasing mechanism.

The leading charge maintaining mechanism 250 configured as described above is driven by the leading hold lever 241 of the leading arm lock mechanism 240.

Specifically, the leading hold lever 241, the leading biasing lever 253, and the leading lock lever 251 form a mechanical linkage. When the leading hold lever 241 is at the hold position, the leading biasing lever 253 and the leading lock lever 251 are also positioned corresponding to the hold position. Specifically, the leading lock lever 251 is at the lock position. In this state, the connection pin 251a is, by biasing force of the biasing spring 253b, positioned at an end part of the long hole 253c close to the connection pin 253a.

The leading hold lever 241 positions, using biasing force of the biasing spring 242, the leading lock lever 251 at the lock position through the leading biasing lever 253, and therefore the leading charge lever 232 can be locked by the lock piece 254 in the state in which the leading drive spring 231 is charged. That is, when the leading charge lever 232 rotates in the charge direction in the state in which the leading lock lever 251 is at the lock position, the third arm 232c of the leading charge lever 232 comes into contact with the lock part 254a. The lock piece 254 is pushed back by the third arm 232c to rotate about the rotation axis 11 against biasing force of the biasing spring 254b. The position at which the lock piece 254 allows passage of the third arm 232c is hereinafter referred to as a "retracted position." After the third arm 232c passes by the lock part 254a, the lock piece 254 returns to the lock position by biasing force of the biasing spring 254b. As a result, rotation of the leading charge lever 232 in the drive direction is restricted by the leading lock lever 251, specifically restricted by the lock piece 254.

When the leading hold lever 241 is positioned at the release position by the second cam part 42, the leading biasing lever 253 and the leading lock lever 251 are also positioned corresponding to the release position. Specifically, the leading lock lever 251 is at the release position. In this state, the connection pin 251a is, by biasing force of the biasing spring 253b, positioned at the end part of the long hole 253c close to the connection pin 253a.

Note that, in the case where the leading lock lever 251 is held at the lock position by the leading attractive unit 252, the leading lock lever 251 remains at the lock position even if the leading hold lever 241 is at the release position. On the other hand, the leading biasing lever 253 moves to the position corresponding to the release position of the leading hold lever 241 in combination with movement of the leading hold lever 241. In this state, the long hole 253*c* moves relative to the connection pin 251*a*. That is, in the long hole 253*c*, the connection pin 251*a* is positioned away from the connection pin 253*a*. As a result, the biasing spring 253*b* is pulled to generate elastic force. Such elastic force acts as biasing force for pulling the connection pin 251*a* toward the connection pin 253*a*. When energization of the electric magnet of the leading attractive unit 252 is stopped in this state, the leading lock lever 251 moves from the lock position to the release position by biasing force of the biasing spring 253*b*. In the case where the leading lock lever 251 locks the leading charge lever 232 at the lock position, the leading charge lever 232 is unlocked by the leading lock lever 251.

The leading biasing lever 253 and the biasing spring 253*b* forming the leading biasing mechanism are operated in combination with the leading hold lever 241. That is, the leading hold lever 241 also functions as part of the leading biasing mechanism, i.e., part of the leading charge maintaining mechanism 250.

[6-2. Trailing-Curtain Unit]

The trailing charge maintaining mechanism 350 includes the trailing lock lever 351 configured to lock the trailing charge lever 332, a trailing attractive unit 352 configured to hold the trailing lock lever 351 at a later-described lock position, a trailing biasing lever 353 configured to bias the trailing lock lever 351 in a release direction in which the trailing lock lever 351 moves away from the lock position, and the transmission lever 356 configured to operate the trailing biasing lever 353.

The trailing lock lever 351 is, at one end part thereof, supported so as to rotate the rotation axis M. A connection pin 351*a* is provided at the other end part of the trailing lock lever 351. The connection pin 351*a* is connected to the trailing biasing lever 353.

A lock piece 354 is provided at the trailing lock lever 351. The lock piece 354 is formed in a hook shape. The lock piece 354 is supported by the trailing lock lever 351 so as to rotate about the rotation axis m1. The position of the lock piece 354 in the X-axis direction is the same as the position of the engagement part 332*e* of the trailing charge lever 332 in the X-axis direction. The lock piece 354 is, by a biasing spring 354*b*, biased in one direction (counterclockwise as viewed in the figure) about the rotation axis m1. The lock piece 354 biased in one direction about the rotation axis m1 stops at such a position that part of the lock piece 354 protrudes from the trailing lock lever 351. Such a position of the lock piece 354 is hereinafter referred to as the "lock position." The trailing lock lever 351 is an example of a trailing lock member.

An attractive piece 355 is provided at the trailing lock lever 351. The attractive piece 355 is made of permalloy.

The trailing lock lever 351 is configured to rotate about the rotation axis M to move between the lock position at which the lock piece 354 is positioned on the track of rotation of the engagement part 332*e* of the trailing charge lever 332 and the release position at which the lock piece 354 is positioned out of the track of rotation of the engagement part 332*e* of the trailing charge lever 332. When the trailing lock lever 351 is at the lock position, the attractive piece 355 contacts the trailing attractive unit 352. On the other hand, when the trailing lock lever 351 is at the release position, the attractive piece 355 is apart from the trailing attractive unit 352.

The trailing attractive unit 352 includes an electric magnet. When the trailing lock lever 351 is at the lock position, the trailing attractive unit 352 energizes the electric magnet to attract the attractive piece 355. In this manner, the trailing attractive unit 352 holds, by electromagnetic force, the trailing lock lever 351 at the lock position. The trailing attractive unit 352 is an example of a first trailing hold member.

The transmission lever 356 is supported so as to rotate about the rotation axis K. The transmission lever 356 includes a first arm 356*a* and the second arm 356*b*. A roller 356*c* is rotatably provided at a tip end of the first arm 356*a*. The position of the roller 356*c* in the X-axis direction is the same as the position of the fourth cam part 44 of the drive cam mechanism 400 in the X-axis direction. A tip end part of the second arm 356*b* is connected to the trailing biasing lever 353.

A biasing spring 356*d* is provided at the transmission lever 356. The biasing spring 356*d* is winded about the rotation axis K, and is configured to bias the transmission lever 356 in one direction (clockwise as viewed in the figure) about the rotation axis K. The transmission lever 356 is biased by the biasing spring 356*d* to rotate about the rotation axis K to the position at which the transmission lever 356 contacts the second stopper 12*e*. Such a position of the transmission lever 356 is hereinafter referred to as a "lock position."

When the transmission lever 356 is positioned so as to contact the second stopper 12*e*, the roller 356*c* is positioned on the track of rotation of the fourth cam part 44. When the drive cam mechanism 400 rotates, in this state, to cause the fourth cam part 44 to contact the roller 356*c*, the transmission lever 356 rotates in the other direction about the rotation axis K such that the roller 356*c* moves over an outer circumferential surface of the fourth cam part 44. Such a position of the transmission lever 356 is hereinafter referred to as a "release position."

One end part of the trailing biasing lever 353 is rotatably connected to the second arm 356*b* of the transmission lever 356. A long hole 353*c* is formed so as to penetrate the other end part of the trailing biasing lever 353. A connection pin 353*a* is provided at a middle part of the trailing biasing lever 353. The connection pin 351*a* of the trailing lock lever 351 is inserted into the long hole 353*c*. In this manner, the trailing biasing lever 353 is connected to the trailing lock lever 351 through the long hole 353*c* and the connection pin 351*a*. In the long hole 353*c*, the connection pin 351*a* is movable in a longitudinal direction of the long hole 353*c*. One end part of a biasing spring 353*b* is connected to the connection pin 353*a*, and the other end part of the biasing spring 353*b* is connected to the connection pin 351*a*. That is, the connection pin 351*a* is, by the biasing spring 353*b*, biased toward the connection pin 353*a* in the long hole 353*c*.

In the trailing charge maintaining mechanism 350 configured as described above, the transmission lever 356, the trailing biasing lever 353, and the trailing lock lever 351 form a mechanical linkage. When the transmission lever 356 is at the lock position, the trailing biasing lever 353 and the trailing lock lever 351 are also positioned corresponding to the lock position. Specifically, the trailing lock lever 351 is at the lock position. In this state, the connection pin 351*a* is, by biasing force of the biasing spring 353*b*, positioned at an end part of the long hole 353*c* close to the connection pin 353*a*.

The transmission lever 356 positions, using biasing force of the biasing spring 356*d*, the trailing lock lever 351 at the lock position through the trailing biasing lever 353, and therefore the trailing charge lever 332 can be locked by the lock piece 354 in the state in which the trailing drive spring 331 is charged. That is, when the trailing charge lever 332 rotates in the charge direction in the state in which the trailing lock lever 351 is held at the lock position by the trailing attractive unit 352, the engagement part 332*e* of the trailing charge lever 332 comes into contact with the lock piece 354. The lock piece 354 is pushed back by the engagement part 332e to rotate about the rotation axis m1 against biasing force of the biasing spring 354b. The position at which the lock piece 354 allows passage of the engagement part 332e is hereinafter referred to as a "retracted position." After the engagement part 332e passes by the lock piece 354, the lock piece 354 returns to the lock position by biasing force of the biasing spring 354b. As a result, rotation of the trailing charge lever 332 in the drive direction is restricted by the trailing lock lever 351, specifically restricted by the lock piece 354.

On the other hand, when the transmission lever 356 is positioned at the release position by the fourth cam part 44, the trailing biasing lever 353 and the trailing lock lever 351 are also positioned corresponding to the release position. Specifically, the trailing lock lever 351 is at the release position. In this state, the connection pin 351a is, by biasing force of the biasing spring 353b, positioned at the end part of the long hole 353c close to the connection pin 353a.

Note that, in the case where the trailing lock lever 351 is held at the lock position by the trailing attractive unit 352, the trailing lock lever 351 remains at the lock position even if the transmission lever 356 is at the release position. On the other hand, the trailing biasing lever 353 moves to the position corresponding to the release position of the transmission lever 356 in combination with movement of the transmission lever 356. In this state, the long hole 353c moves relative to the connection pin 351a. That is, in the long hole 353c, the connection pin 351a is positioned away from the connection pin 353a. As a result, the biasing spring 353b is pulled to generate elastic force. Such elastic force acts as biasing force for pulling the connection pin 351a toward the connection pin 353a. When energization of the electric magnet of the trailing attractive unit 352 is stopped in this state, the trailing lock lever 351 moves from the lock position to the release position by biasing force of the biasing spring 353b. In the case where the trailing lock lever 351 locks the trailing charge lever 332 at the lock position, the trailing charge lever 332 is unlocked by the trailing lock lever 351. The trailing hold lever 341, the trailing biasing lever 353, and the biasing spring 353b is an example of a trailing biasing mechanism.

[7. Operation of Shutter Device]

Operation of the shutter device 1 will be described below. Starting from the state right after completion of exposure, the operation of the shutter device 1 will be described.

[7-1. State right after Completion of Exposure]

Referring to FIG. 1, right after completion of exposure, the leading blade group 210 is in the open state in which the leading blades 21 overlap with each other outside the openings 11a, 12a, whereas the trailing blade group 310 is in the closed state in which the trailing blades 31 spread out to cover the openings 11a, 12a.

Referring to FIG. 5, in the leading-curtain unit 200, the leading lock lever 251 is at the release position, and the leading charge lever 232 is unlocked by the leading lock lever 251. In addition, the roller 232d of the leading charge lever 232 does not engage with the first cam part 41. Thus, the leading charge lever 232 has rotated in the drive direction by biasing force of the leading drive spring 231. Referring to FIG. 3, the third arm 232c of the leading charge lever 232 contacts the second arm 234b of the brake lever 234. Thus, the leading charge lever 232 has rotated to the position at which the third arm 234c of the brake lever 234 contacts the stopper 234h. The leading charge lever 232 stops at such a position. In this state, the second arm 232b of the leading charge lever 232 contacts the contact part 223e of the leading drive lever 223 to rotate, together with the leading charge lever 232, the leading drive lever 223 in the opening direction. As just described, the leading blade group 210 is in the open state.

On the other hand, referring to FIG. 5, in the trailing-curtain unit 300, the trailing lock lever 351 is at the release position, and the trailing charge lever 332 is unlocked by the trailing lock lever 351. In addition, the roller 332d of the trailing charge lever 332 does not engage with the first cam part 41. Thus, the trailing charge lever 332 has rotated in the drive direction by biasing force of the trailing drive spring 331. Referring to FIG. 3, the third arm 332c of the trailing charge lever 332 contacts the second arm 334b of the brake lever 334. Thus, the trailing charge lever 332 has rotated to the position at which the third arm 334c of the brake lever 334 contacts the stopper 334h. The trailing charge lever 332 stops at such a position. In this state, the second arm 332b of the trailing charge lever 332 contacts the contact part 323e of the trailing drive lever 323 to rotate, together with the trailing charge lever 332, the trailing drive lever 323 in the closing direction. As just described, the trailing blade group 310 is in the closed state.

Referring to FIG. 5, in the leading-curtain unit 200, the roller 241c of the leading hold lever 241 engages with the second cam part 42. Specifically, the roller 241c is on the outer circumferential surface of the second cam part 42. Thus, the leading hold lever 241 is at the release position. In the trailing-curtain unit 300, the roller 356c of the transmission lever 356 engages with the fourth cam part 44. Specifically, the roller 356c is on the outer circumferential surface of the fourth cam part 44. Thus, the tip end part of the second arm 356b of the transmission lever 356 contacts the contact part 341e of the trailing hold lever 341, and the trailing hold lever 341 is at the release position as illustrated in FIG. 5.

[7-2. Beginning of Charging of Trailing Curtain Unit]

Figure 7:
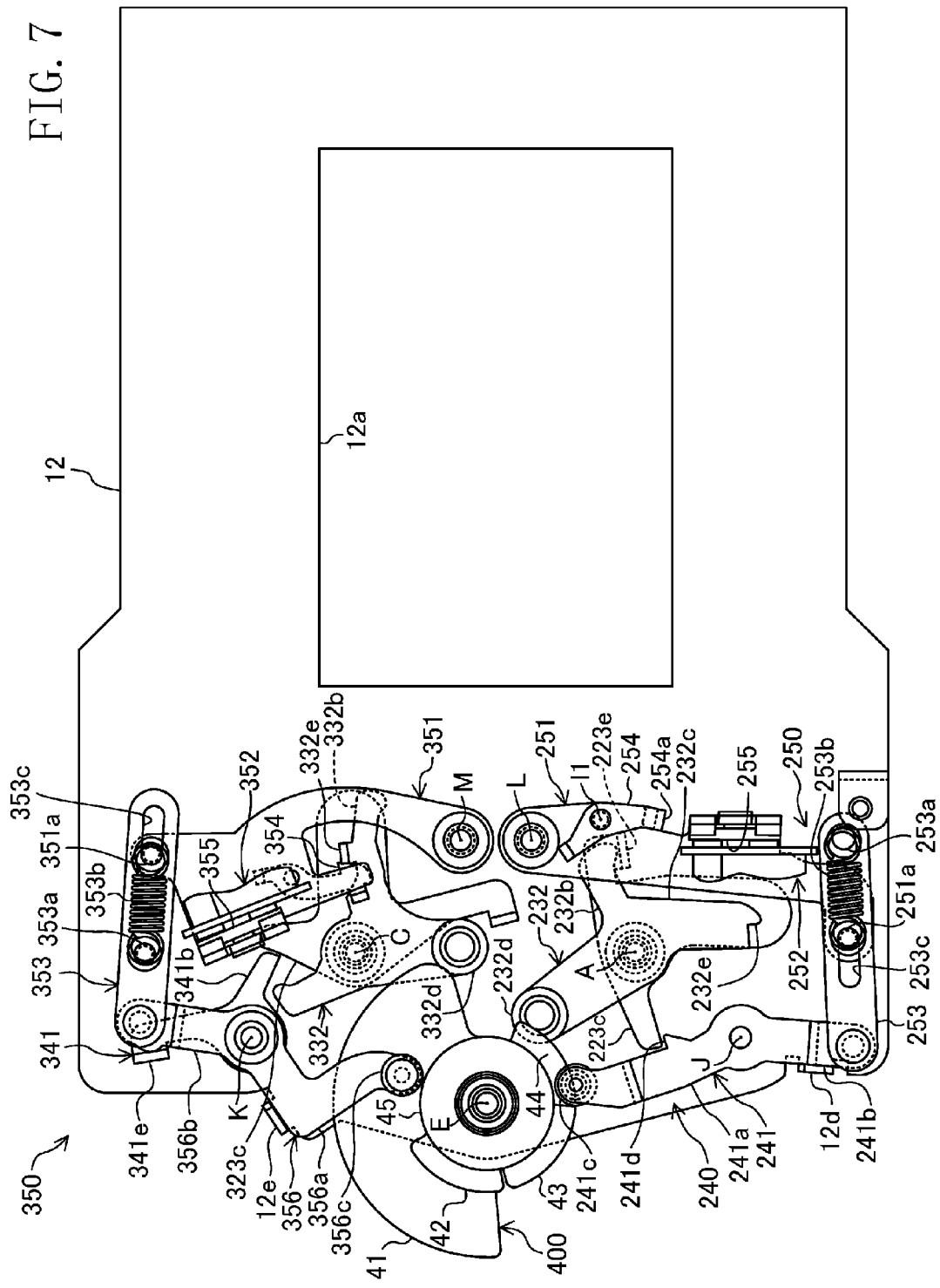
FIG. 7 is a view illustrating the states of the charge mechanisms, the arm lock mechanisms, and the charge maintaining mechanisms when charging of a trailing-curtain unit begins.
Figure 8:
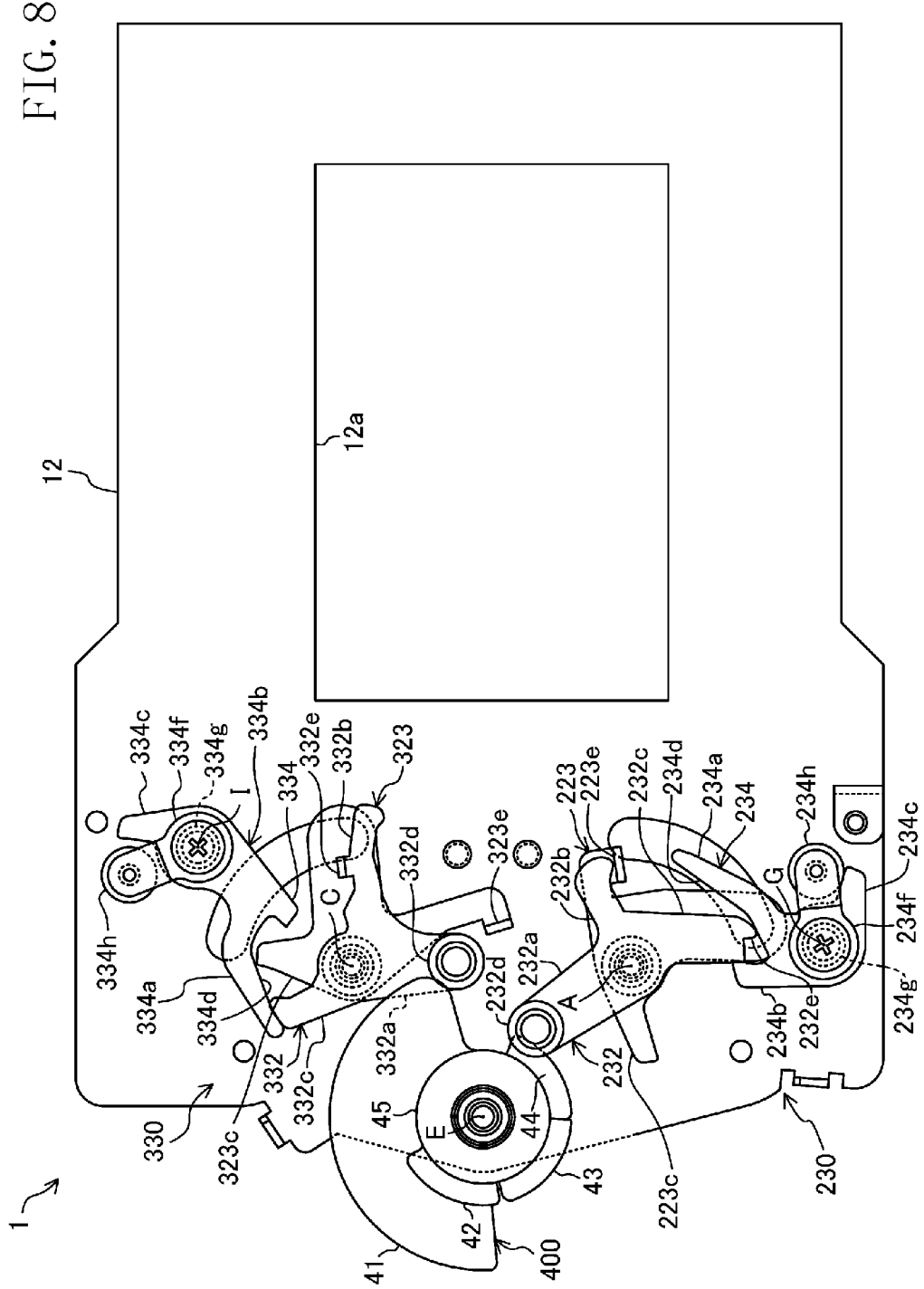
FIG. 8 is a view illustrating the states of brake levers when charging of the trailing-curtain unit begins.

Next, the beginning of charging of the trailing-curtain unit 300 will be described with reference to FIGS. 7 and 8. FIG. 7 is a view illustrating the states of the charge mechanisms, the arm lock mechanisms, and the charge maintaining mechanisms when charging of the trailing-curtain unit 300 begins. FIG. 8 is a view illustrating the states of the brake levers when charging of the trailing-curtain unit 300 begins.

Upon completion of exposure, charging of the trailing-curtain unit 300 begins. In this state, reading of charge from an image sensor (not shown in the figure) is also performed in parallel, and therefore the state in which the trailing blade group 310 covers the openings 11a, 12a is maintained. That is, the trailing charge mechanism 330 is charged in the state in which the trailing blade group 310 is in the closed state.

Upon completion of exposure, the drive cam mechanism 400 rotates to disengage the second cam part 42 and the roller 241c of the leading hold lever 241 from each other and to disengage the fourth cam part 44 and the roller 356c of the transmission lever 356 from each other.

Accordingly, the leading hold lever 241 moves to the hold position by biasing force of the biasing spring 242. At the hold position, the lock part 241d is positioned on the track of rotation of the third arm 223c of the leading drive lever 223. In this state, the lock part 241d is positioned on a closing-direction side of the third arm 223c about the rotation axis A. The leading drive lever 223 is biased in the closing direction about the rotation axis A by biasing force of the leading set spring 224 (see FIG. 1) provided at the leading driven arm 222. Such biasing force causes the contact part 223e of the leading drive lever 223 to contact the second arm 232b of the leading charge lever 232. On the other hand, the leading charge lever 232 is biased in the drive direction (opposite to the closing direction of the leading drive lever 223) about the rotation axis A by the leading drive spring 231 (see FIG. 3).

Since biasing force of the leading drive spring 231 is greater than biasing force of the leading set spring 224, the leading drive lever 223 stops at the position at which the contact part 223e contacts the second arm 232b of the leading charge lever 232. In this state, the third arm 223c of the leading drive lever 223 does not contact the lock part 241d of the leading hold lever 241.

In combination with movement of the leading hold lever 241, the leading lock lever 251 of the leading charge maintaining mechanism 250 moves to the lock position. The attractive piece 255 of the leading lock lever 251 is pushed against the leading attractive unit 252.

Similarly, the transmission lever 356 moves to the lock position by biasing force of the biasing spring 356d. In combination with movement of the transmission lever 356, the trailing lock lever 351 moves to the lock position. The attractive piece 355 of the trailing lock lever 351 is pushed against the trailing attractive unit 352.

In such a state, the trailing hold lever 341 whose contact part 341e is pushed by the second arm 356b of the transmission lever 356 also moves, in combination with movement of the transmission lever 356, to the hold position by biasing force of the biasing spring 342. At the hold position, the second arm 341b of the trailing hold lever 341 is positioned on the track of rotation of the third arm 323c of the trailing drive lever 323. In this state, the second arm 341b is positioned on an opening-direction side of the third arm 323c about the rotation axis A. The trailing drive lever 323 is biased in the opening direction about the rotation axis A by biasing force of the trailing set spring 324 provided at the trailing driven arm 322. Thus, the contact part 323e of the trailing drive lever 323 contacts the second arm 332b of the trailing charge lever 332. Note that the trailing charge lever 332 is biased in the drive direction (opposite to the opening direction of the trailing drive lever 323) about the rotation axis A by the trailing drive spring 331. Since biasing force of the trailing drive spring 331 is greater than biasing force of the trailing set spring 324, the trailing drive lever 323 stops at the position at which the contact part 323e contacts the second arm 332b of the trailing charge lever 332. In this state, the third arm 323c of the trailing drive lever 323 does not contact the second arm 341b of the trailing hold lever 341.

When the drive cam mechanism 400 further rotates, the roller 332d of the trailing charge lever 332 and the first cam part 41 begin engaging with each other. Accordingly, the trailing charge lever 332 begins rotating in the charge direction, and winding-up, i.e., charging, of the trailing drive spring 331 (see FIG. 3) begins.

After the trailing charge lever 332 begins rotating, the engagement part 332e comes into contact with the lock piece 354. When the trailing charge lever 332 further rotates from such a state, the lock piece 354 is pushed back by the engagement part 332e to rotate to the refracted position against biasing force of the biasing spring 354b. This allows passage of the engagement part 332e.

When the trailing charge lever 332 rotates in the charge direction, rotation restriction of the trailing drive lever 323 by the second arm 332b is cancelled. Accordingly, the trailing drive lever 323 rotates in the opening direction in association with rotation of the trailing charge lever 332 in the charge direction. However, right after the trailing drive lever 323 begins rotating in the opening direction, the third arm 323c comes into contact with the second arm 341b of the trailing hold lever 341, and therefore rotation of the trailing drive lever 323 is stopped. That is, the trailing drive lever 323 is in the state in which the trailing drive lever 323 is held by the trailing hold lever 341.

Referring to FIG. 8, when the trailing charge lever 332 further rotates, the third arm 332c slides on the sliding surface 334d of the brake lever 334. In combination with such sliding, the brake lever 334 rotates to cause the third arm 334c of the brake lever 334 to move away from the stopper 334h.

[7-3. Completion of Charging of Trailing Curtain Unit]

Figure 9:
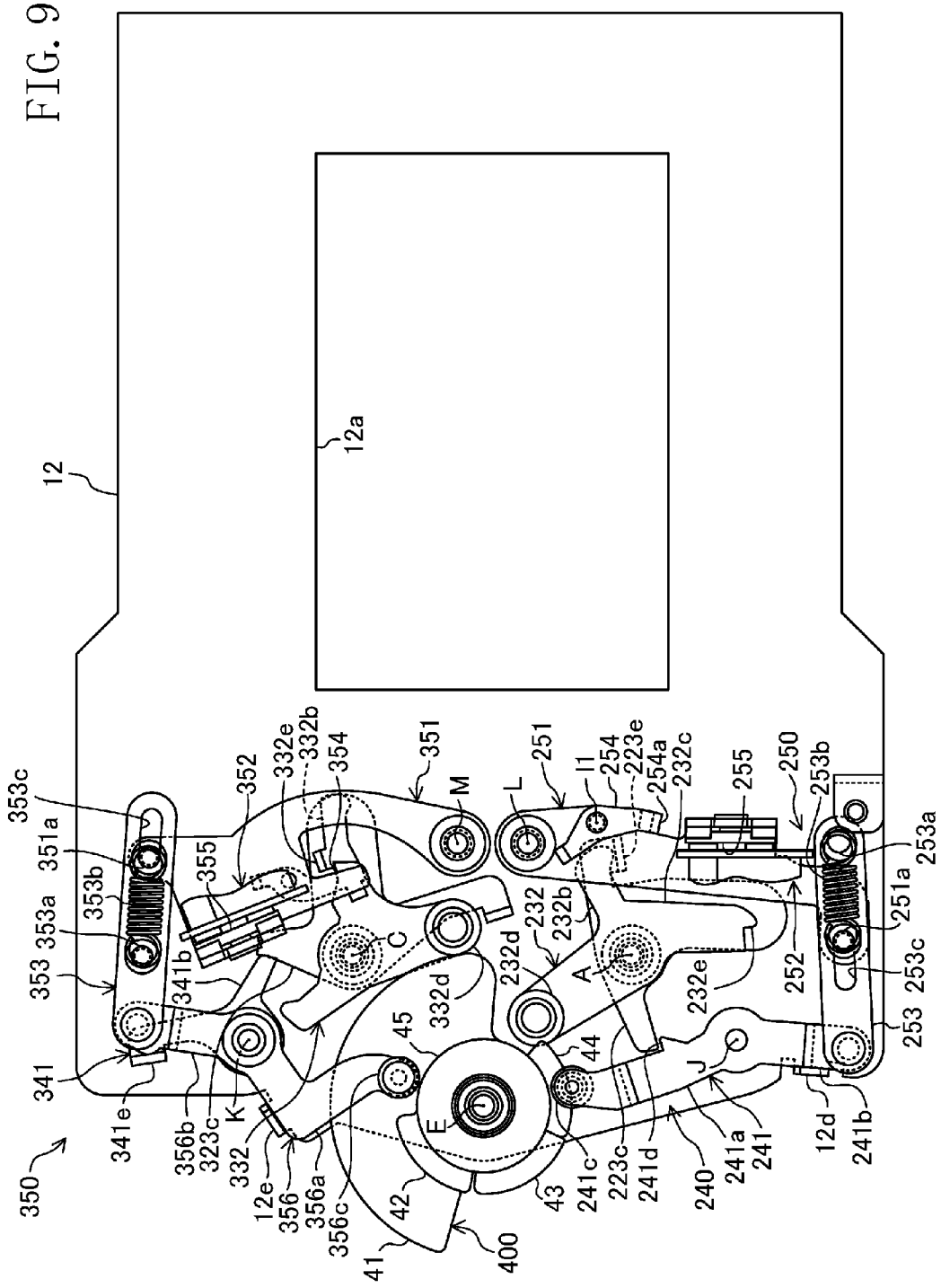
FIG. 9 is a view illustrating the states of the charge mechanisms, the arm lock mechanisms, and the charge maintaining mechanisms when charging of the trailing-curtain unit is completed.

Next, completion of charging of the trailing-curtain unit 300 will be described with reference to FIG. 9. FIG. 9 is a view illustrating the states of the charge mechanisms, the arm lock mechanisms, and the charge maintaining mechanisms when charging of the trailing-curtain unit 300 is completed.

When the roller 332d has completely moved over the outer circumferential surface of the first cam part 41, the engagement part 332e passes by the lock piece 354, and then the lock piece 354 returns to an original state, i.e., the lock position, by biasing force of the biasing spring 354b. That is, the lock piece 354 is positioned on a driving-direction side of the engagement part 332e about the rotation axis C on the track of rotation of the engagement part 332e.

Although not shown in the figure, the third arm 332c of the trailing charge lever 332 contacts the sliding surface 334d at a tip end part of the first arm 334a of the brake lever 334.

In this manner, charging of the trailing-curtain unit 300 is completed.

[7-4. Beginning of Charging of Leading Curtain Unit]

Figure 10:
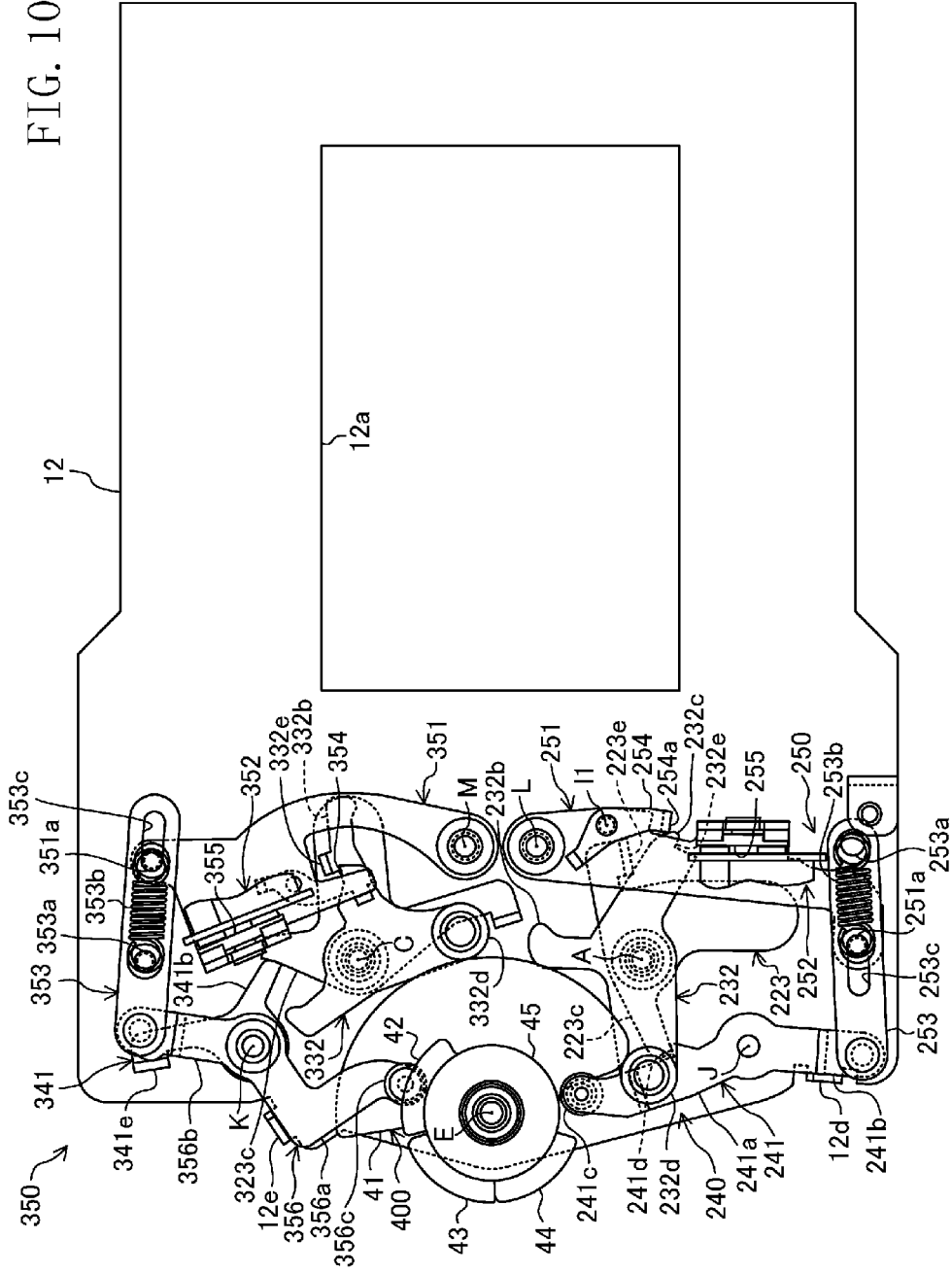
FIG. 10 is a view illustrating the states of the charge mechanisms, the arm lock mechanisms, and the charge maintaining mechanisms when charging of a leading-curtain unit begins.
Figure 11:
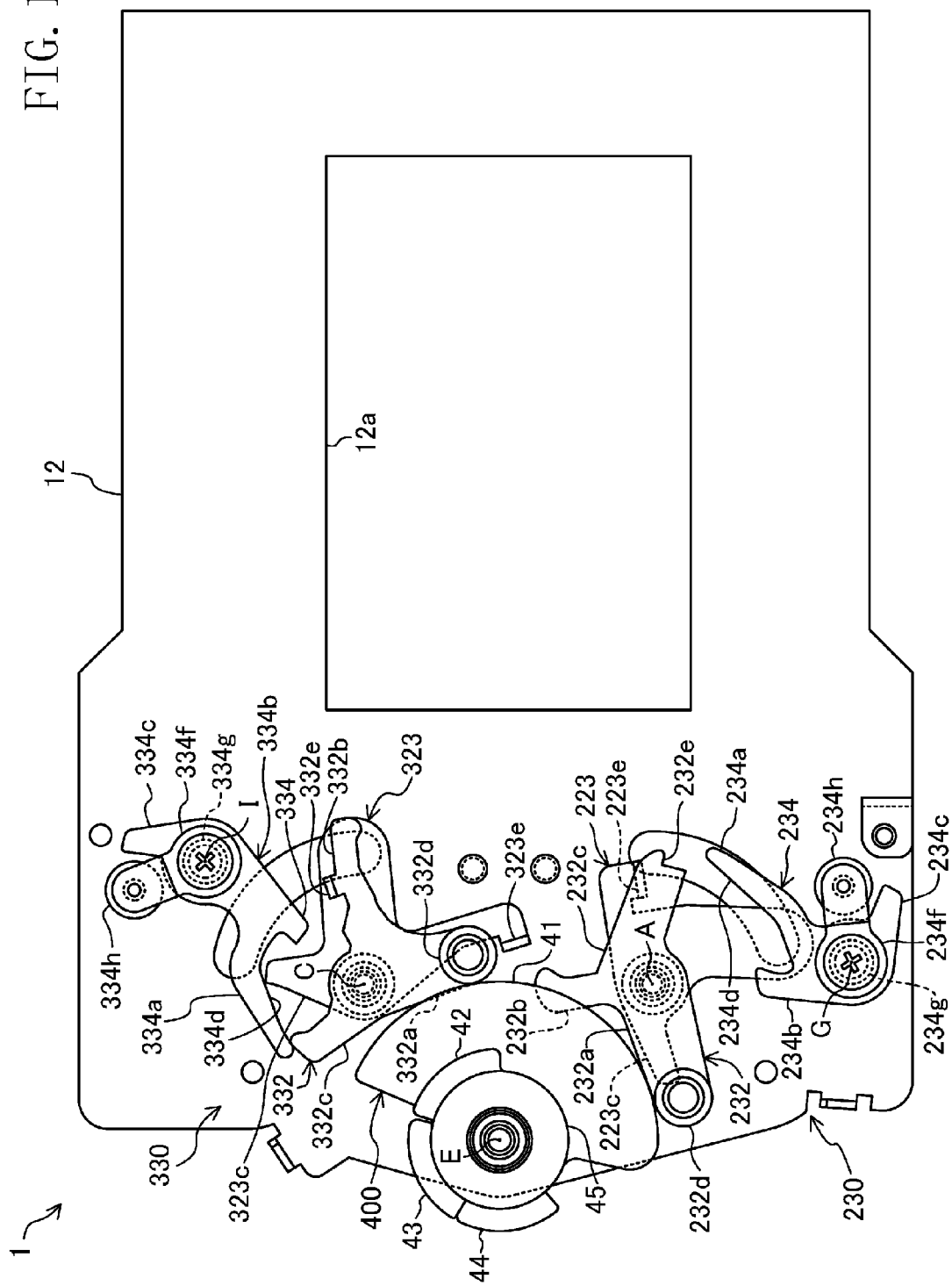
FIG. 11 is a view illustrating the states of the brake levers when charging of the leading-curtain unit begins.

Next, operation at the beginning of charging of the leading-curtain unit 200 will be described with reference to FIGS. 10 and 11. FIG. 10 is a view illustrating the states of the charge mechanisms, the arm lock mechanisms, and the charge maintaining mechanisms when charging of the leading-curtain unit 200 begins. FIG. 11 is a view illustrating the states of the brake levers when charging of the leading-curtain unit 200 begins.

When the drive cam mechanism 400 further rotates, the roller 232d of the leading charge lever 232 and the first cam part 41 begin engaging with each other. Accordingly, the leading charge lever 232 begins rotating in the charge direction, and winding-up, i.e., charging, of the leading drive spring 231 (see FIG. 3) begins.

After the leading charge lever 232 begins rotating, the third arm 232c of the leading charge lever 232 comes into contact with the lock part 254a of the lock piece 254. When the leading charge lever 232 further rotates from such a state, the lock piece 254 is pushed back by the third arm 232c to rotate to the retracted position against biasing force of the biasing spring 254b (see FIG. 4). This allows passage of the third arm 232c.

When the leading charge lever 232 rotates in the charge direction, rotation restriction of the leading drive lever 223 by the second arm 232b is cancelled. Accordingly, the leading drive lever 223 rotates in the closing direction in association with rotation of the leading charge lever 232 in the charge direction. However, right after the leading drive lever 223 begins rotating in the closing direction, the third arm 223c comes into contact with the lock part 241d of the leading hold lever 241, and therefore rotation of the leading drive lever 223 is stopped. That is, the leading drive lever 223 is in the state in which the leading drive lever 223 is held by the leading hold lever 241.

Referring to FIG. 11, when the leading charge lever 232 further rotates, the third arm 232c slides on the sliding surface 234d of the brake lever 234. In combination with such sliding, the brake lever 234 rotates to cause the third arm 234c of the brake lever 234 to move away from the stopper 234h.

[7-5. Completion of Charging of Leading Curtain Unit]

Figure 12:
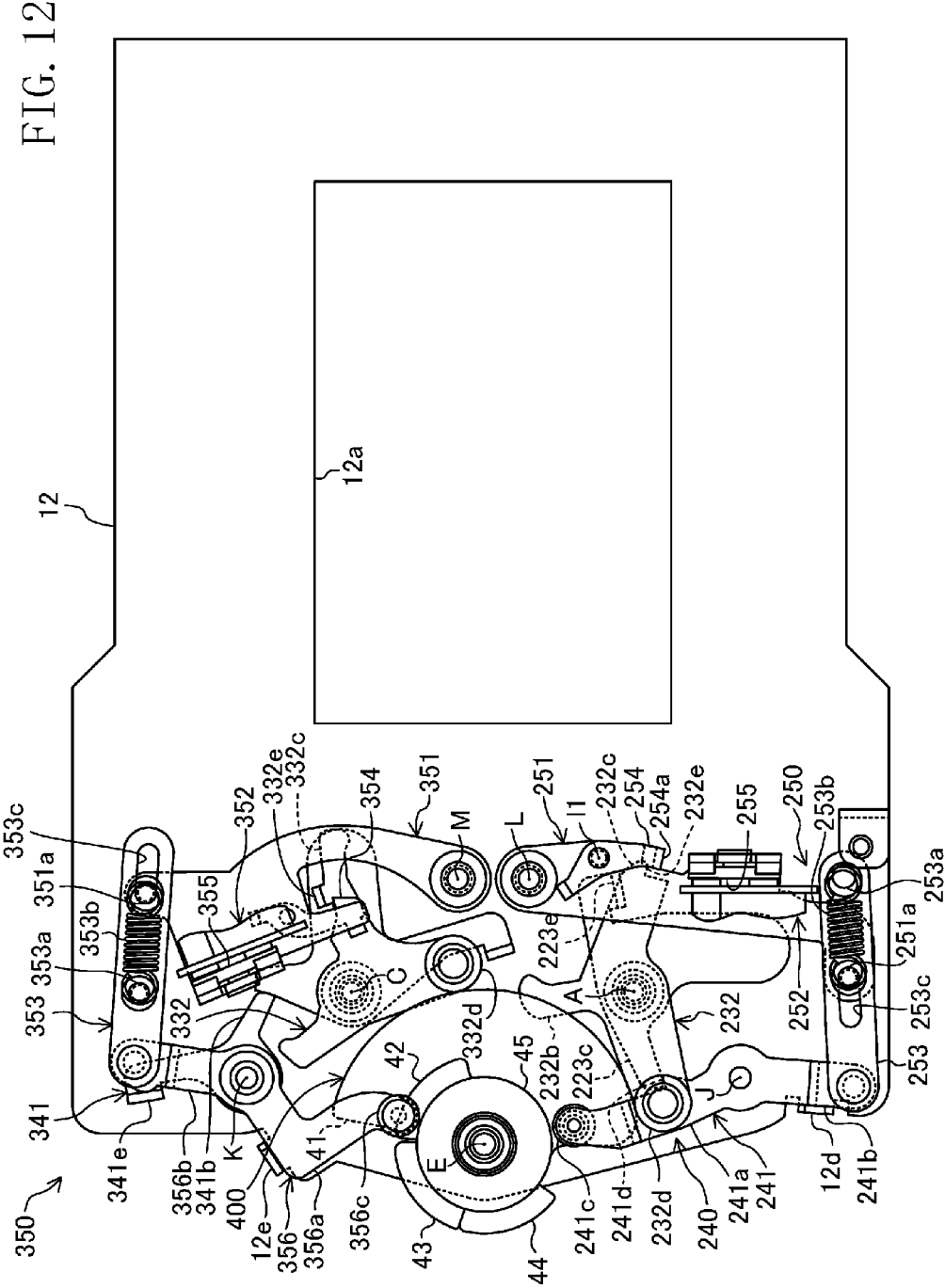
FIG. 12 is a view illustrating the states of the charge mechanisms, the arm lock mechanisms, and the charge maintaining mechanisms when charging of the leading-curtain unit is completed.

Next, completion of charging of the leading-curtain unit 200 will be described with reference to FIG. 12. FIG. 12 is a view illustrating the states of the charge mechanisms, the arm lock mechanisms, and the charge maintaining mechanisms when charging of the leading-curtain unit 200 is completed.

When the roller 232*d* has completely moved over the outer circumferential surface of the first cam part 41, the engagement part 232*e* of the third arm 232*c* passes by the lock part 254*a*, and then the lock piece 254 returns to an original state, i.e., the lock position, by biasing force of the biasing spring 254*b*. That is, the lock part 254*a* is positioned on a driving-direction side of the engagement part 232*e* about the rotation axis A on the track of rotation of the engagement part 232*e*.

In this manner, charging of the leading-curtain unit 200 is completed.

Even in the configuration in which charging of both of the leading-curtain unit 200 and the trailing-curtain unit 300 is performed by the drive cam mechanism 400, the timing of charging the leading-curtain unit 200 and the timing of charging the trailing-curtain unit 300 are differentiated from each other (i.e., the leading-curtain unit 200 and the trailing-curtain unit 300 are not simultaneously charged), and therefore driving force of the drive cam mechanism 400 can be reduced. In particular, such a configuration is advantageous in the case where the elastic constants of the leading drive spring 231 and the trailing drive spring 331 are large.

[7-6. Live-Viewing]

Figure 13:
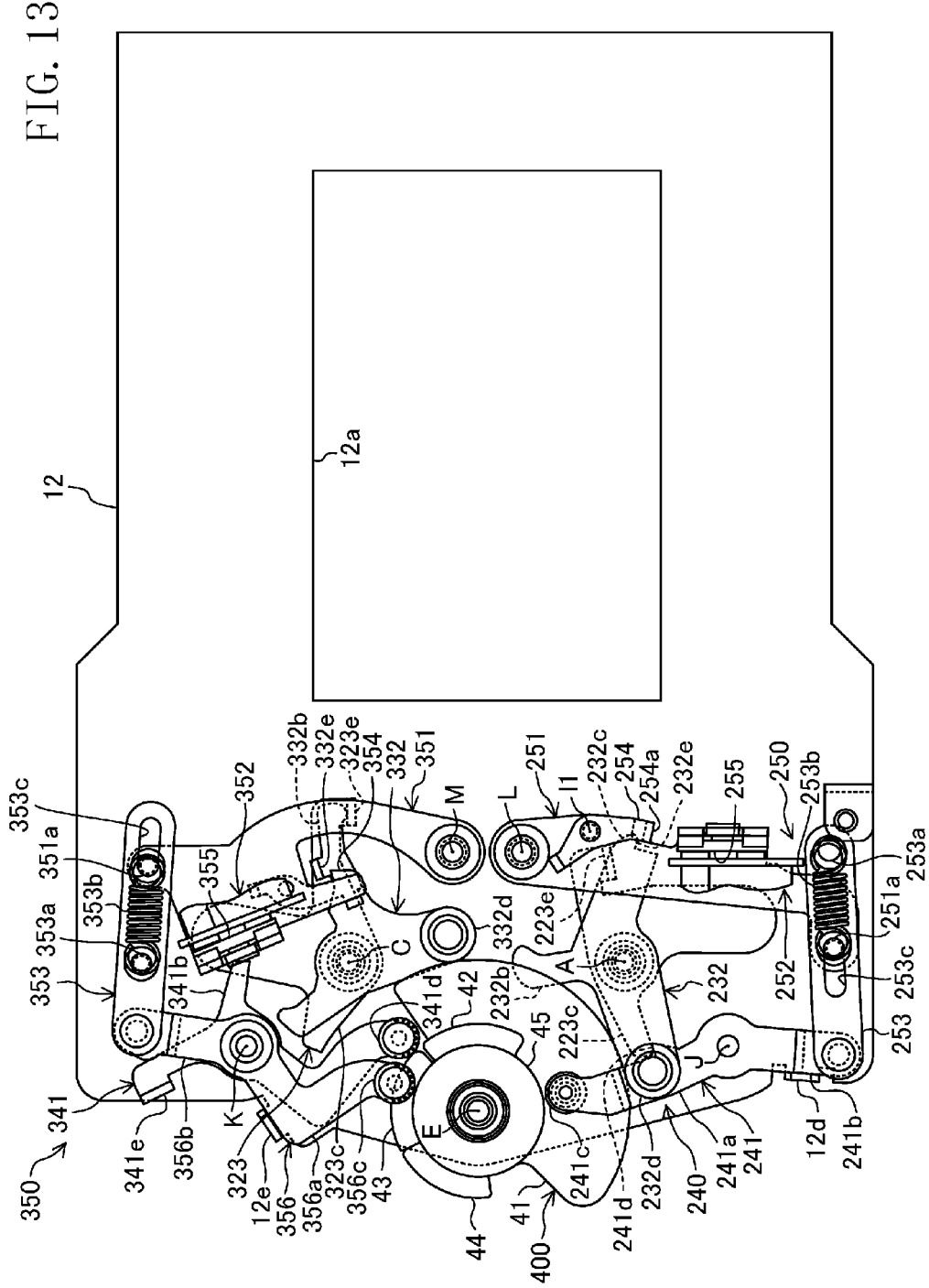
FIG. 13 is a view illustrating the states of the charge mechanisms, the arm lock mechanisms, and the charge maintaining mechanisms when the trailing arm lock mechanism is released.
Figure 14:
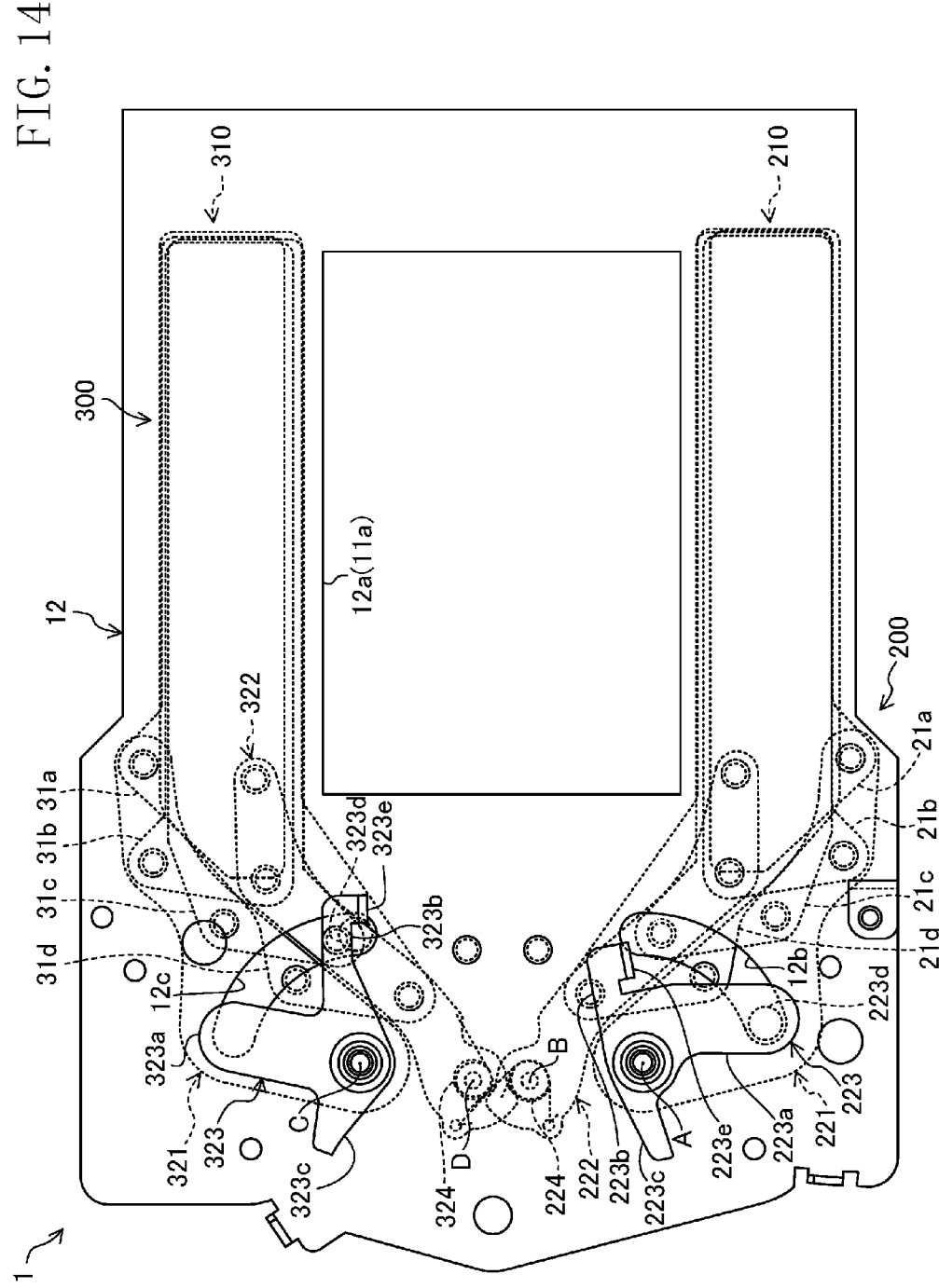
FIG. 14 is a view illustrating the states of drive arms, driven arms, and blade groups when the trailing arm lock mechanism is released.

Next, operation in live-viewing will be described with reference to FIGS. 13 and 14. FIG. 13 is a view illustrating the states of the charge mechanisms, the arm lock mechanisms, and the charge maintaining mechanisms when the trailing arm lock mechanism 340 is released. FIG. 14 is a view illustrating the states of the drive arms, the driven arms, and the blade groups when the trailing arm lock mechanism 340 is released.

When the drive cam mechanism 400 further rotates, the third cam part 43 comes into engagement with the roller 341*d* of the trailing hold lever 341, and the trailing hold lever 341 rotates against biasing force of the biasing spring 342. Referring to FIG. 13, when the roller 341*d* has moved over the outer circumferential surface of the third cam part 43, the trailing hold lever 341 is at the release position. Thus, the trailing drive lever 323 held by the trailing hold lever 341 is released. As a result, the trailing drive lever 323 rotates in the opening direction by biasing force of the trailing set spring 324. The trailing drive lever 323 stops at the position at which the contact part 323*e* contacts the second arm 332*b* of the trailing charge lever 332.

In this state, referring to FIG. 14, the trailing drive arm 321 and the trailing driven arm 322 rotates in the opening direction in combination with rotation of the trailing drive lever 323. As a result, the trailing blade group 310 is in the open state in which the trailing blades 31 of the trailing blade group 310 overlap with each other outside the openings 11*a*, 12*a*. Since the leading drive lever 223 is locked by the leading hold lever 241 in this state, the leading blade group 210 remains in the open state. In this manner, the openings 11*a*, 12*a* are opened, and live-view shooting can be performed.

[7-7. Preparation for Exposure]

Figure 15:
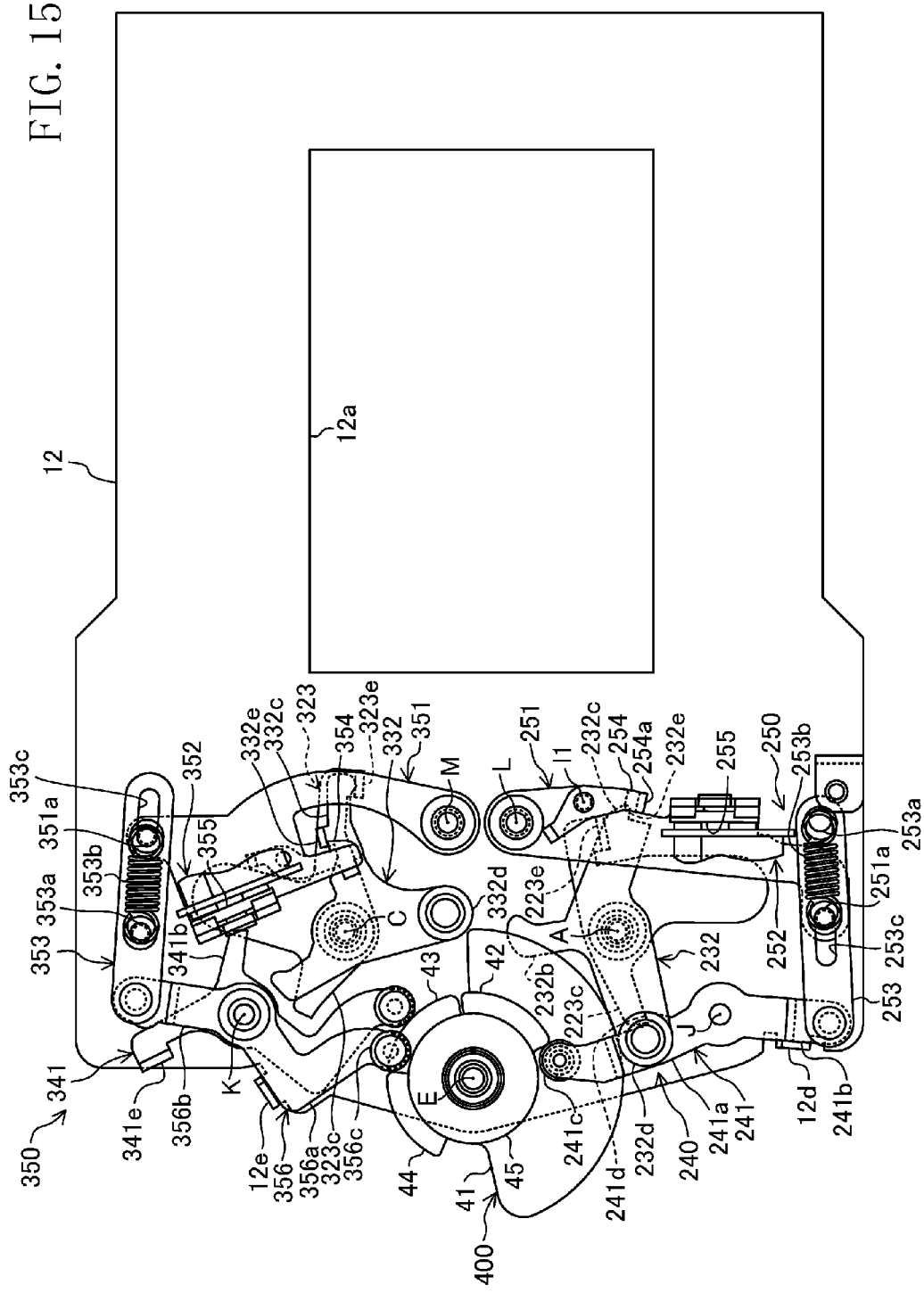
FIG. 15 is a view illustrating the states of the charge mechanisms, the arm lock mechanisms, and the charge maintaining mechanisms when a first cam part and a trailing charge lever disengage from each other.
Figure 16:
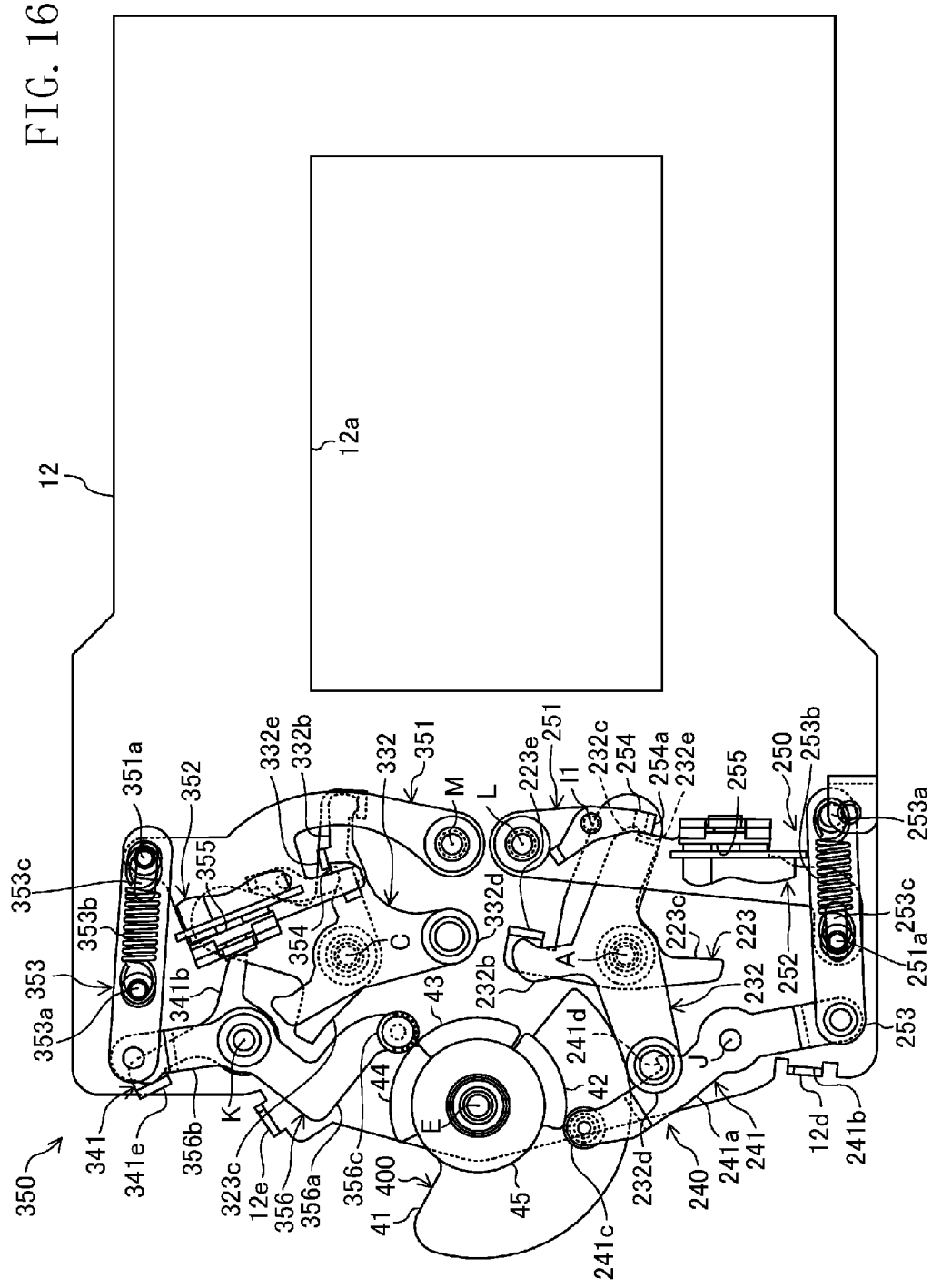
FIG. 16 is a view illustrating the states of the charge mechanisms, the arm lock mechanisms, and the charge maintaining mechanisms when the leading arm lock mechanism is released.
Figure 17:
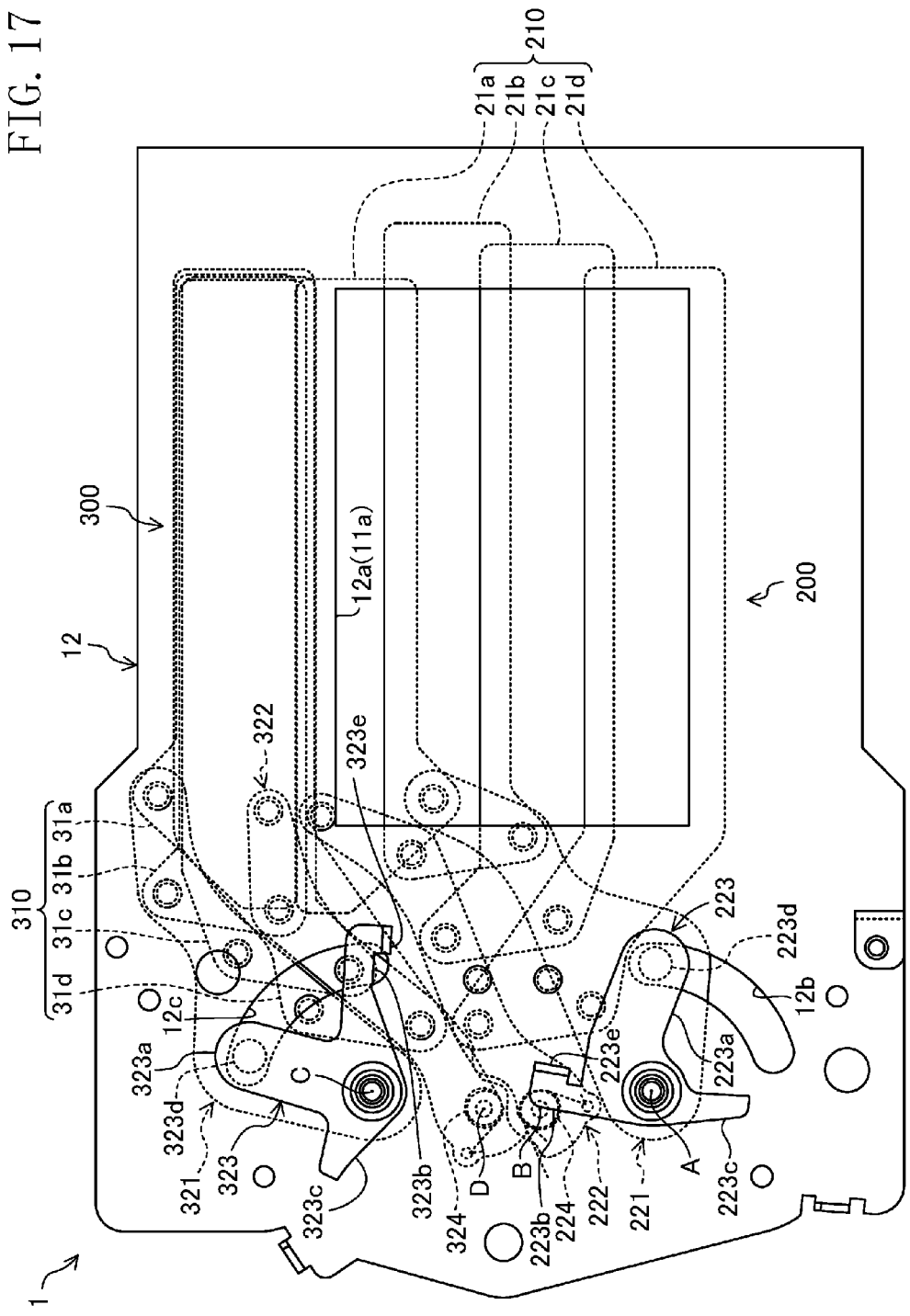
FIG. 17 is a view illustrating the states of the drive arms, the driven arms, and the blade groups when the leading arm lock mechanism is released.
Figure 18:
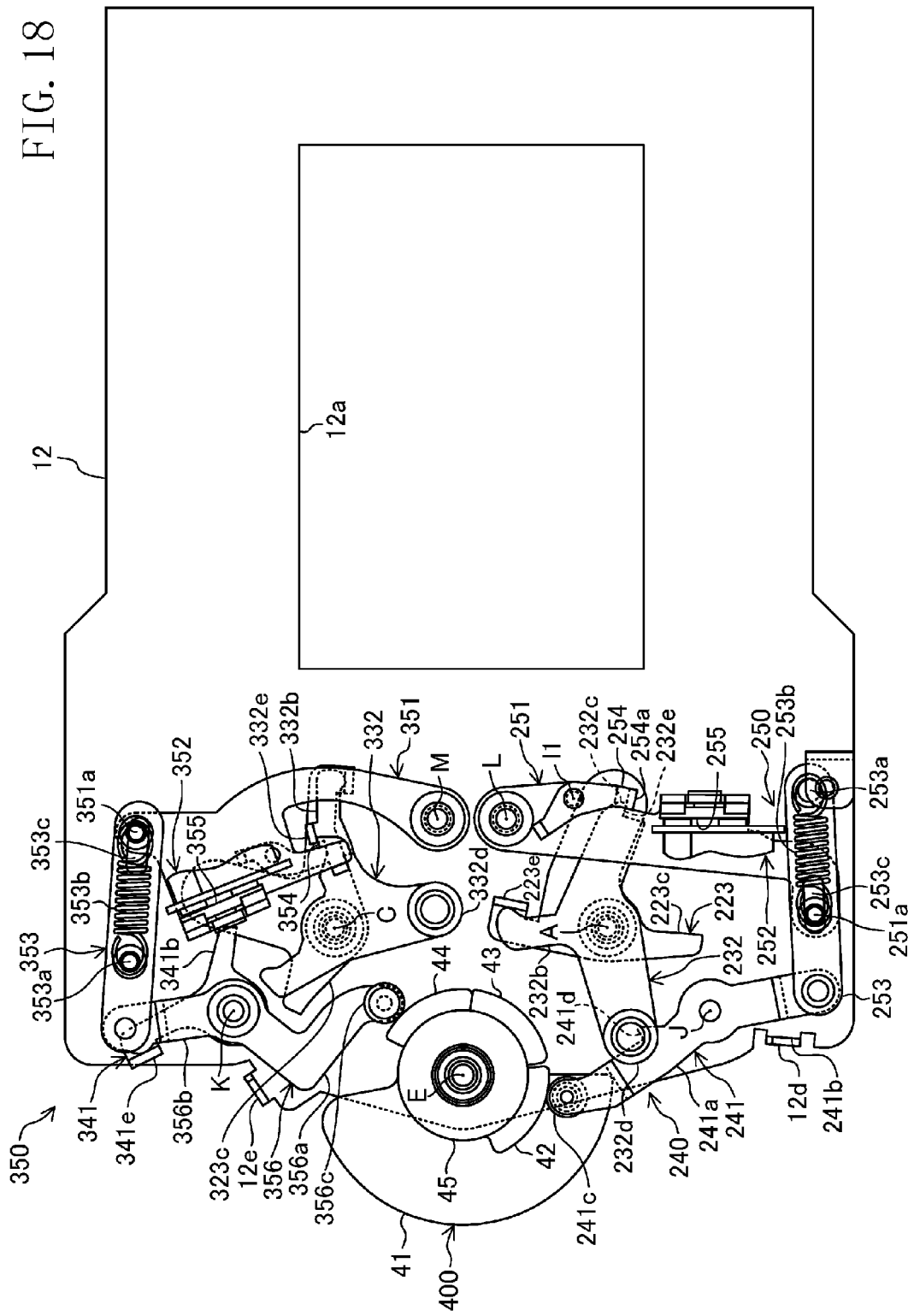
FIG. 18 is a view illustrating the states of the charge mechanisms, the arm lock mechanisms, and the charge maintaining mechanisms when the first cam part and a leading charge lever disengage from each other.

Next, operation in preparation for exposure will be described with reference to FIGS. 15-18. FIG. 15 is a view illustrating the states of the charge mechanisms, the arm lock mechanisms, and the charge maintaining mechanisms when the first cam part 41 and the trailing charge lever 332 disengage from each other. FIG. 16 is a view illustrating the states of the charge mechanisms, the arm lock mechanisms, and the charge maintaining mechanisms when the leading arm lock mechanism 240 is released. FIG. 17 is a view illustrating the states of the drive arms, the driven arms, and the blade groups when the leading arm lock mechanism 240 is released. FIG. 18 is a view illustrating the states of the charge mechanism, the arm lock mechanism, and the charge maintaining mechanism when the first cam part 41 and the leading charge lever 232 disengage from each other.

First, the leading attractive unit 252 of the leading charge maintaining mechanism 250 is energized to attract the attractive piece 255 of the leading lock lever 251. Meanwhile, the trailing attractive unit 352 of the trailing charge maintaining mechanism 350 is energized to attract the attractive piece 355 of the trailing lock lever 351.

Subsequently, when the drive cam mechanism 400 further rotates, the first cam part 41 and the roller 332*d* of the trailing charge lever 332 disengage from each other as illustrated in FIG. 15. Although the trailing charge lever 332 begins rotating in the drive direction by biasing force of the trailing drive spring 331, the engagement part 332*e* comes into engagement with the lock piece 354 right after the trailing charge lever 332 begins rotating, and therefore rotation of the trailing charge lever 332 is restricted. That is, the trailing charge lever 332 is in the state in which the trailing charge lever 332 is locked by the trailing lock lever 351.

Note that, when the trailing charge lever 332 rotates in the drive direction, the trailing drive lever 323 contacting the trailing charge lever 332 through the contact part 323*e* also rotates in the drive direction.

When the drive cam mechanism 400 further rotates, the second cam part 42 comes into engagement with the roller 241*c* of the leading hold lever 241, and the leading hold lever 241 rotates against biasing force of the biasing spring 242 (see FIG. 4). Referring to FIG. 16, when the roller 241*c* has moved over the outer circumferential surface of the second cam part 42, the leading hold lever 241 is at the release position. Thus, the leading drive lever 223 held by the leading hold lever 241 is released. As a result, the leading drive lever 223 rotates in the closing direction by biasing force of the leading set spring 224 (see FIG. 1). The leading drive lever 223 stops at the position at which the contact part 223*e* contacts the second arm 232*b* of the leading charge lever 232.

In this state, referring to FIG. 17, the leading drive arm 221 and the leading driven arm 222 rotates in the closing direction in combination with rotation of the leading drive lever 223. As a result, the leading blade group 210 is in the closed state in which the leading blades 21 of the leading blade group 210 cover the openings 11*a*, 12*a*. In this manner, the openings 11*a*, 12*a* are closed.

Referring to FIG. 16, when the leading hold lever 241 moves to the release position, the leading biasing lever 253 moves accordingly. However, since the attractive piece 255 of the leading lock lever 251 adheres to the leading attractive unit 252, the leading lock lever 251 remains at the lock position. As a result, the connection pin 251*a* of the leading lock lever 251 relatively moves away from the connection pin 253*a* of the leading biasing lever 253 in the long hole 253*c* of the leading biasing lever 253. This generates elastic force at the biasing spring 253*b*. In this manner, the leading lock lever 251 is held at the lock position while biasing force for moving the leading lock lever 251 to the release position is stored.

The fourth cam part 44 comes into engagement with the roller 356*c* of the transmission lever 356 at the substantially same timing as the timing at which the second cam part 42 comes into engagement with the roller 241*c* of the leading hold lever 241. When the fourth cam part 44 engages with the roller 356*c*, the transmission lever 356 rotates, referring to FIG. 16, against biasing force of the biasing spring 356*d* (see FIG. 5) to move to the release position. When the transmission lever 356 moves to the release position, the trailing biasing lever 353 moves accordingly. However, since the attractive piece 355 of the trailing lock lever 351 adheres to the trailing attractive unit 352, the trailing lock lever 351 remains at the lock position. As a result, the connection pin 351a of the trailing lock lever 351 relatively moves away from the connection pin 353a of the trailing biasing lever 353 in the long hole 353c of the trailing biasing lever 353. This generates elastic force at the biasing spring 353b. In this manner, the trailing lock lever 351 is held at the lock position while biasing force for moving the trailing lock lever 351 to the release position is stored.

When the drive cam mechanism 400 further rotates, the first cam part 41 and the roller 232d of the leading charge lever 232 disengage from each other as illustrated in FIG. 18. Although the leading charge lever 232 begins rotating in the drive direction by biasing force of the leading drive spring 231, the engagement part 232e comes into engagement with the lock part 254a of the lock piece 254 right after the leading charge lever 232 begins rotating, and therefore rotation of the leading charge lever 232 is restricted. That is, the leading charge lever 232 is in the state in which the leading charge lever 232 is locked by the leading lock lever 251.

Note that, when the leading charge lever 232 rotates in the drive direction, the leading drive lever 223 contacting the leading charge lever 232 through the contact part 223e also rotates in the drive direction.

In this manner, preparation for exposure is completed.

The timing at which the leading attractive unit 252 attracts the attractive piece 255 of the leading lock lever 251 is not limited to the foregoing as long as such timing is before the second cam part 42 engages with the roller 241c of the leading hold lever 241. Similarly, the timing at which the trailing attractive unit 352 attracts the attractive piece 355 of the trailing lock lever 351 is not limited to the foregoing as long as such timing is before the fourth cam part 44 engages with the roller 356c of the transmission lever 356.

[7-8. Exposure]

Figure 19:
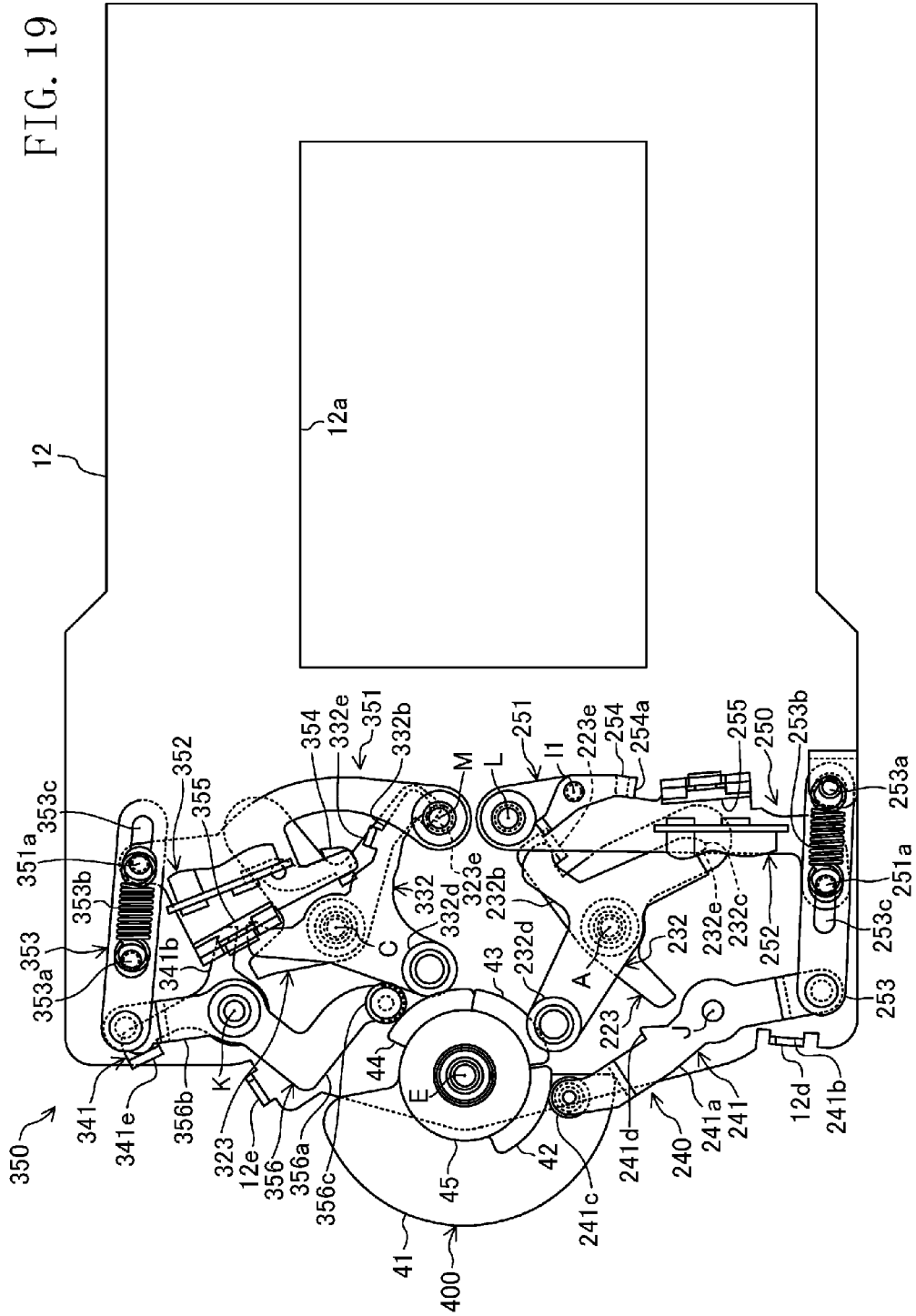
FIG. 19 is a view illustrating the states of the charge mechanisms, the arm lock mechanisms, and the charge maintaining mechanisms during exposure.
Figure 20:
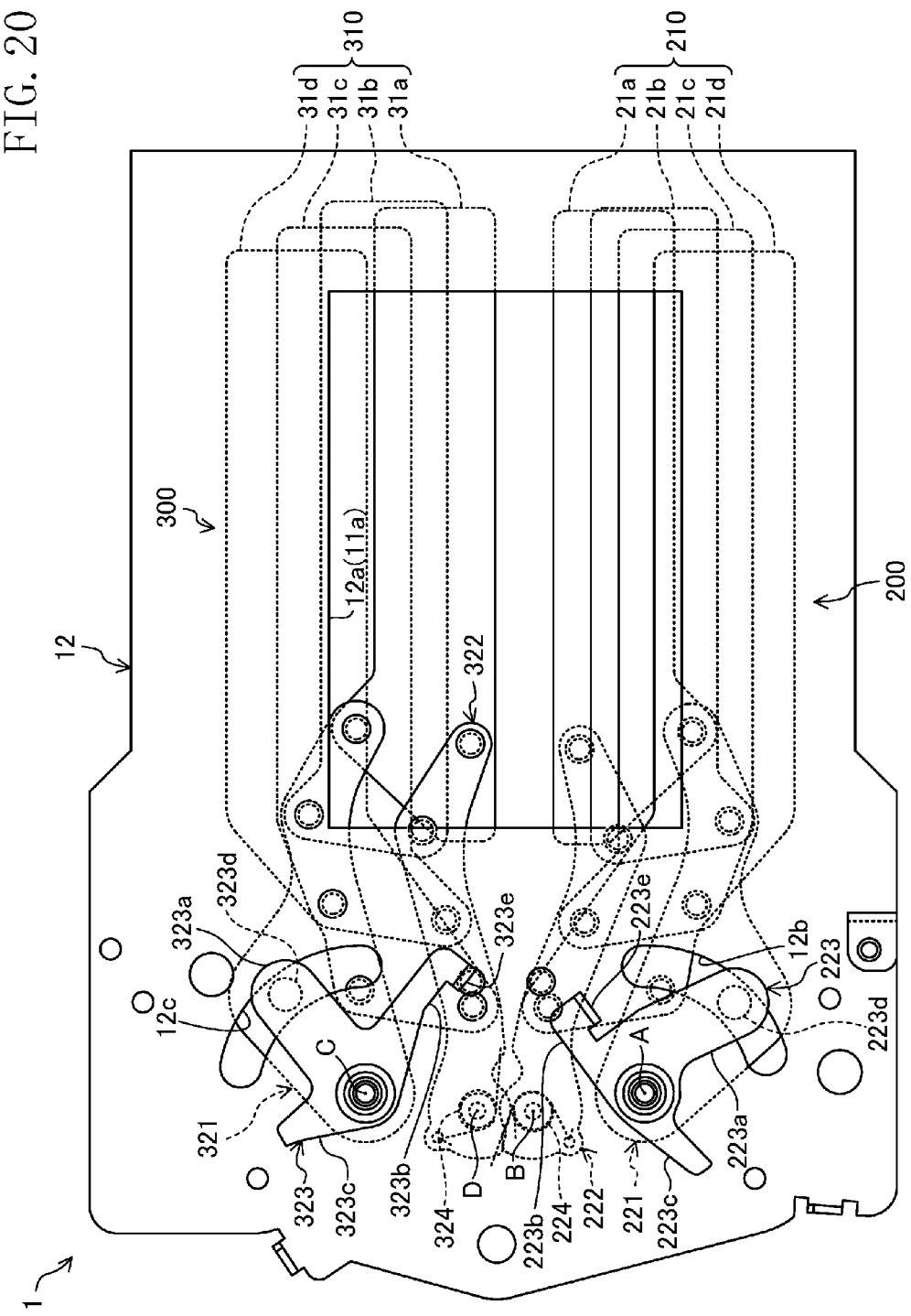
FIG. 20 is a view illustrating the states of the drive arms, the driven arms, and the blade groups during exposure.

Next, operation in exposure will be described with reference to FIGS. 19 and 20. FIG. 19 is a view illustrating the states of the charge mechanisms, the arm lock mechanisms, and the charge maintaining mechanisms during exposure. FIG. 20 is a view illustrating the states of the drive arms, the driven arms, and the blade groups during exposure.

When exposure begins, energization of the leading attractive unit 252 by the leading charge maintaining mechanism 250 is stopped, and energization of the trailing attractive unit 352 by the trailing charge maintaining mechanism 350 is stopped.

Specifically, energization of the leading attractive unit 252 by the leading charge maintaining mechanism 250 is first stopped. Then, referring to FIG. 19, the leading lock lever 251 moves from the lock position to the release position by biasing force of the biasing spring 253b. When the leading lock lever 251 has moved to the release position, the leading charge lever 232 is unlocked by the lock piece 254. As a result, the leading charge lever 232 rotates in the drive direction by biasing force of the leading drive spring 231. In this state, since the second arm 232b of the leading charge lever 232 pushes the contact part 223e of the leading drive lever 223, the leading drive lever 223 rotates in the opening direction together with the leading charge lever 232. Referring to FIG. 20, when the leading drive lever 223 rotates in the opening direction, the leading drive arm 221 and the leading driven arm 222 also rotate in the opening direction, and the leading blade group 210 moves to the open position.

After the lapse of a predetermined time since energization of the leading attractive unit 252 by the leading charge maintaining mechanism 250 is stopped, energization of the trailing attractive unit 352 by the trailing charge maintaining mechanism 350 is stopped. Then, referring to FIG. 19, the trailing lock lever 351 moves from the lock position to the release position by biasing force of the biasing spring 353b. When the trailing lock lever 351 has moved to the release position, the trailing charge lever 332 is unlocked by the lock piece 354. As a result, the trailing charge lever 332 rotates in the drive direction by biasing force of the trailing drive spring 331. In this state, since the second arm 332b of the trailing charge lever 332 pushes the contact part 323e of the trailing drive lever 323, the trailing drive lever 323 rotates in the closing direction together with the trailing charge lever 332. Referring to FIG. 20, when the trailing drive lever 323 rotates in the closing direction, the trailing drive arm 321 and the trailing driven arm 322 also rotate in the closing direction, and the trailing blade group 310 moves to the closed position.

As just described, energization of the leading attractive unit 252 and energization of the trailing attractive unit 352 are stopped at different timings slightly differentiated from each other. Thus, referring to FIG. 20, the leading blade group 210 and the trailing blade group 310 moves from the top to the bottom in the state in which a slit-shaped opening is formed therebetween.

As the leading charge lever 232 rotates in the drive direction, the third arm 232c of the leading charge lever 232 eventually comes into contact with the second arm 234b of the brake lever 234. Accordingly, the brake lever 234 rotates. In this state, since rotation resistance is provided to the brake lever 234 by the wave washer 234g, the brake lever 234 puts a brake on rotation of the leading charge lever 232. Then, referring to FIG. 3, the third arm 234c of the brake lever 234 comes into contact with the stopper 234h, and therefore rotation of the brake lever 234 is restricted. Accordingly, rotation of the leading charge lever 232 is also stopped.

Similarly, as the trailing charge lever 332 rotates in the drive direction, the third arm 332c of the trailing charge lever 332 eventually comes into contact with the second arm 334b of the brake lever 334. Accordingly, the brake lever 334 rotates. In this state, since rotation resistance is provided to the brake lever 334 by the wave washer 334g, the brake lever 334 puts a brake on rotation of the trailing charge lever 332. Then, the third arm 334c of the brake lever 334 comes into contact with the stopper 334h, and therefore rotation of the brake lever 334 is restricted. Accordingly, rotation of the trailing charge lever 332 is also stopped.

Referring to FIG. 1, when rotation of the leading charge lever 232 and the trailing charge lever 332 has stopped, the leading blade group 210 is in the open state, and the trailing blade group 310 is in the closed state.

As described above, exposure is completed.

[8. Advantages]

The shutter device 1 includes the base plate 11 in which the opening 11a is formed; the leading blades 21 capable of opening/closing the opening 11a; the leading drive lever 223 configured to rotate in the closing direction to move the leading blades 21 to the closed position at which the leading blades 21 cover the opening 11a and to rotate in the opening direction opposite to the closing direction to move the leading blades 21 to the open position at which the leading blades 21 open the opening 11a; the leading charge mechanism 230 including the leading drive spring 231 and the leading charge lever 232 configured to elastically deform the leading drive spring 231 and configured to rotate the leading charge lever 232 in the charge direction in which the leading drive spring 231 is elastically deformed to generate biasing force and to rotate, using the biasing force of the leading drive spring 231, the leading charge lever 232 in the drive direction opposite to the charge direction to cause the leading charge lever 232 to rotate the leading drive lever 223 in the opening direction; the leading lock lever 251 configured to lock the leading charge lever 232 having rotated in the charge direction; the leading attractive unit 252 configured to hold, using electromagnetic force, the leading lock lever 251 locking the leading charge lever 232; and the leading biasing mechanism configured to generate biasing force for biasing the leading lock lever 251 in the release direction in which the leading charge lever 232 is unlocked after the leading lock lever 251 is held by the leading attractive unit 252. As an example, the leading hold lever 241, the leading biasing lever 253, and the biasing spring 253b form the leading biasing mechanism.

According to the foregoing configuration, the leading drive lever 223 rotates in the opening direction to move the leading blades 21 to the open position at which the leading blades 21 open the opening 11a, and the leading drive lever 223 rotates in the closing direction to move the leading blades 21 to the closed position at which the leading blades 21 cover the opening 11a. Such movement of the leading blades 21 to the open position is realized in such a manner that the leading charge lever 232 rotates in the drive direction by biasing force of the leading drive spring 231 and that the leading charge lever 232 rotates the leading drive lever 223 in the opening direction. Biasing force of the leading drive spring 231 is generated in such a manner that the leading charge lever 232 rotates in the charge direction. The leading lock lever 251 locks the leading charge lever 232 having rotated in the charge direction, and the leading lock lever 251 locking the leading charge lever 232 is, using electromagnetic force, held by the leading attractive unit 252. When the leading lock lever 251 held by the leading attractive unit 252 is released, the leading biasing mechanism moves the leading lock lever 251 in the release direction. Accordingly, the leading charge lever 232 locked by the leading lock lever 251 is unlocked, and the leading charge lever 232 rotates in the drive direction by biasing force of the leading drive spring 231.

As just described, the leading charge lever 232 elastically deforming the leading drive spring 231 is not directly held, but the leading lock lever 251 locking the leading charge lever 232 is held by the leading attractive unit 252. Thus, electromagnetic force for holding the leading charge lever 232 is less than that in the configuration in which the leading charge lever 232 is directly held.

As a result, even in a full-frame shutter device formed with large openings 11a, 12a, electromagnetic force for holding a leading charge lever 232 can be reduced. Thus, the size of the shutter device can be reduced, and power consumption can be reduced.

In the state in which the leading biasing mechanism biases the leading lock lever 251 in the release direction, the leading attractive unit 252 cancels holding of the leading lock lever 251 to rotate the leading charge lever 232 in the drive direction by biasing force of the leading drive spring 231.

According to the foregoing configuration, when the leading lock lever 251 is held by the leading attractive unit 252, the leading biasing mechanism biases the leading lock lever 251 in the release direction. Thus, when the leading lock lever 251 held by the leading attractive unit 252 is released, the leading lock lever 251 moves in the release direction. That is, the leading blades 21 begin moving to the open position in such a manner that the leading lock lever 251 held by the leading attractive unit 252 is released.

In the state in which the leading biasing mechanism unbiases the leading lock lever 251 in the release direction, the leading biasing mechanism restricts movement of the leading lock lever 251 to prevent the leading charge lever 232 locked by the leading lock lever 251 from being unlocked.

Specifically, the leading hold lever 241 and the leading biasing lever 253 of the leading biasing mechanism position the leading lock lever 251 at the lock position. In this state, the connection pin 251a of the leading lock lever 251 is positioned at the end part of the long hole 253c of the leading biasing lever 253 close to the connection pin 253a. Thus, movement of the leading lock lever 251 in the release direction is restricted. Consequently, locking of the leading charge lever 232 by the leading lock lever 251 can be maintained.

The leading biasing mechanism includes the leading hold lever 241 configured to hold the leading drive lever 223 in the state in which the leading blades 21 have moved to the open position. The leading drive lever 223 is biased in the closing direction, and rotates in the closing direction in such a manner that holding of the leading drive lever 223 by the leading hold lever 241 is canceled when the leading biasing mechanism biases the leading lock lever 251 in the release direction.

That is, biasing of the leading lock lever 251 in the release direction is a step prior to release of the leading lock lever 251 held by the leading attractive unit 252, i.e., a step prior to movement of the leading blades 21 to the open position by the leading drive lever 223. Thus, the leading hold lever 241 cancels holding of the leading drive lever 223 when the leading lock lever 251 is biased in the release direction to rotate the leading drive lever 223 in the closing direction, thereby positioning the leading blades 21 at the closed position. That is, when the leading lock lever 251 is biased in the release direction, the leading hold lever 241 positions the leading blades 21 at the closed position in preparation for subsequent movement of the leading blades 21 to the open position.

According to the foregoing configuration, the leading blades 21 can be held at the open position. Moreover, the leading charge lever 232 can charge the leading drive spring 231 independently of the leading drive lever 223. When exposure is performed, the leading blades 21 can be easily moved to the closed position. As a result, a normally-open state can be easily realized.

The shutter device 1 further includes the cam mechanism 400 including the first cam part 41 configured to rotate the leading charge lever 232 in the charge direction, and the second cam part 42 configured to operate the leading biasing mechanism such that the leading lock lever 251 is biased in the release direction.

According to the foregoing configuration, the leading charge lever 232 and the leading biasing mechanism can be driven by the drive cam mechanism 400.

The leading biasing mechanism and the leading hold lever 241 move in combination with each other, and are operated by the second cam part 42.

According to the foregoing configuration, release of the leading drive lever 223 held by the leading hold lever 241 and generation of biasing force by the leading biasing mechanism can occur in combination with each other. That is, movement of the leading blades 21 to the closed position and biasing of the leading lock lever 251 in the release direction can occur in combination with each other. Since the step of biasing the leading lock lever 251 in the release direction is the preparation step for exposure, the leading blades 21 can be also moved to the closed position in preparation for exposure.

The leading lock lever 251 includes the lock piece 254 capable of being displaced between the lock position at which the lock piece 254 locks the leading charge lever 232 and the refracted position at which the lock piece 254 allows passage of the leading charge lever 232. In the state in which the leading lock lever 251 is held by the leading attractive unit 252, the lock piece 254 moves to the refracted position to allow the leading charge lever 232 to pass by the lock piece 254, and then moves to the lock position to lock the leading charge lever 232.

According to the foregoing configuration, even if the leading lock lever 251 is held by the leading attractive unit 252, the leading charge lever 232 can easily engage with the lock piece 254.

The shutter device 1 includes the base plate 11 in which the opening 11a is formed; the trailing blades 31 capable of opening/closing the opening 11a; the trailing drive lever 323 configured to rotate in the opening direction to move the trailing blades 31 to the open position at which the trailing blades 31 open the opening 11a and to rotate in the closing direction opposite to the opening direction to move the trailing blades 31 to the closed position at which the trailing blades 31 cover the opening 11a; the trailing charge mechanism 330 including the trailing drive spring 331 and the trailing charge lever 332 configured to elastically deform the trailing drive spring 331 and configured to rotate the trailing charge lever 332 in the charge direction in which the trailing drive spring 331 is elastically deformed to generate biasing force and to rotate, using the biasing force of the trailing drive spring 331, the trailing charge lever 332 in the drive direction opposite to the charge direction to cause the trailing charge lever 332 to rotate the trailing drive lever 323 in the closing direction; the trailing lock lever 351 configured to lock the trailing charge lever 332 having rotated in the charge direction; the trailing attractive unit 352 configured to hold, using electromagnetic force, the trailing lock lever 351 locking the trailing charge lever 332; and the trailing biasing mechanism configured to generate biasing force for biasing the trailing lock lever 351 in the release direction in which the trailing lock lever 351 is unlocked after the trailing lock lever 351 is held by the trailing attractive unit 352. As an example, the transmission lever 356, the trailing biasing lever 353, and the biasing spring 353b form the trailing biasing mechanism.

According to the foregoing configuration, the trailing drive lever 323 rotates in the opening direction to move the trailing blades 31 to the open position at which the trailing blades 31 open the opening 11a, and the trailing drive lever 323 rotates in the closing direction to move the trailing blades 31 to the closed position at which the trailing blades 31 cover the opening 11a. Such movement of the trailing blades 31 to the closed position is realized in such a manner that the trailing charge lever 332 rotates in the drive direction by biasing force of the trailing drive spring 331 and that the trailing charge lever 332 rotates the trailing drive lever 323 in the closing direction. Biasing force of the trailing drive spring 331 is generated in such a manner that the trailing charge lever 332 rotates in the charge direction. The trailing lock lever 351 locks the trailing charge lever 332 having rotated in the charge direction, and the trailing lock lever 351 locking the trailing charge lever 332 is, using electromagnetic force, held by the trailing attractive unit 352. When the trailing lock lever 351 held by the trailing attractive unit 352 is released, the trailing biasing mechanism moves the trailing lock lever 351 in the release direction. Accordingly, the trailing charge lever 332 locked by the trailing lock lever 351 is unlocked, and the trailing charge lever 332 rotates in the drive direction by biasing force of the trailing drive spring 331.

As just described, the trailing charge lever 332 elastically deforming the trailing drive spring 331 is not directly held, but the trailing lock lever 351 locking the trailing charge lever 332 is held by the trailing attractive unit 352. Thus, electromagnetic force for holding the trailing charge lever 332 is less than that in the configuration in which the trailing charge lever 332 is directly held.

In the state in which the trailing biasing mechanism biases the trailing lock lever 351 in the release direction, the trailing attractive unit 352 cancels holding of the trailing lock lever 351 to rotate the trailing charge lever 332 in the drive direction by biasing force of the trailing drive spring 331.

According to the foregoing configuration, when the trailing lock lever 351 is held by the trailing attractive unit 352, the trailing biasing mechanism biases the trailing lock lever 351 in the release direction. Thus, when the trailing lock lever 351 held by the trailing attractive unit 352 is released, the trailing lock lever 351 moves in the release direction. That is, the trailing blades 31 begin moving to the closed position in such a manner that the trailing lock lever 351 held by the trailing attractive unit 352 is released.

In the state in which the trailing biasing mechanism unbiases the trailing lock lever 351 in the release direction, the trailing biasing mechanism restricts movement of the trailing lock lever 351 to prevent the trailing charge lever 332 locked by the trailing lock lever 351 is prevented from being unlocked.

Specifically, the transmission lever 356 and the trailing biasing lever 353 of the trailing biasing mechanism position the trailing lock lever 351 at the lock position. In this state, the connection pin 351a of the trailing lock lever 351 is positioned at the end part of the long hole 353c of the trailing biasing lever 353 close to the connection pin 353a. Thus, movement of the trailing lock lever 351 in the release direction is restricted. Consequently, locking of the trailing charge lever 332 by the trailing lock lever 351 can be maintained.

The shutter device 1 further includes the trailing hold lever 341 configured to hold the trailing drive lever 323 in the state in which the trailing blades 31 have moved to the closed position. The trailing drive lever 323 is biased in the opening direction, and rotates in the opening direction in such a manner that holding of the trailing drive lever 323 by the trailing hold lever 341 is canceled.

That is, the trailing drive lever 323 is held by the trailing hold lever 341 in the state in which the trailing blades 31 have moved to the closed position. When reading of charge of the image sensor is performed, it is necessary that the openings 11a, 12a are covered such that no light enters the image sensor. That is, reading of charge of the image sensor can be performed in such a manner that the trailing blades 31 are held at the closed position by the trailing hold lever 341. Moreover, while the trailing drive lever 323 holds the trailing hold lever 341, the trailing charge lever 332 can charge the trailing drive spring 331. That is, reading of charge of the image sensor and charging of the trailing drive spring 331 can be performed in parallel.

The trailing hold lever 341 cancels holding of the trailing drive lever 323 when the trailing biasing mechanism biases the trailing lock lever 351 in the release direction.

That is, biasing of the trailing lock lever 351 in the release direction is a step prior to release of the trailing lock lever 351 held by the trailing attractive unit 352, i.e., a step prior to movement of the trailing blades 31 to the closed position by the trailing drive lever 323. Thus, the trailing hold lever 341 cancels holding of the trailing drive lever 323 when the trailing lock lever 351 is biased in the release direction to rotate the trailing drive lever 323 in the opening direction, thereby positioning the trailing blades 31 at the open position. That is, when the trailing lock lever 351 is biased in the release direction, the trailing hold lever 341 positions the trailing blades 31 at the open position in preparation for subsequent movement of the trailing blades 31 to the closed position.

The shutter device 1 further includes the cam mechanism 400 including the first cam part 41 configured to rotate the trailing charge lever 332 in the charge direction, and the fourth cam part 44 configured to operate the trailing biasing mechanism such that the trailing lock lever 351 is biased in the release direction.

According to the foregoing configuration, the trailing charge lever 332 and the trailing biasing mechanism can be driven by the drive cam mechanism 400.

The cam mechanism 400 further includes the third cam part 43 configured to operation the trailing hold lever 341.

According to the foregoing configuration, in addition to the trailing charge lever 332 and the trailing biasing mechanism, the trailing hold lever 341 can be also driven by the drive cam mechanism 400.

The leading cam mechanism and the trailing cam mechanism are the identical cam mechanism 400.

According to the foregoing configuration, the cam mechanism 400 can be used as both of the leading cam mechanism and the trailing cam mechanism. That is, since the number of cam mechanisms can be reduced, the size of the shutter device 1 can be reduced.

The cam mechanism 400 is rotatably driven about the predetermined rotation axis E, and the positions of the second cam part 42, the third cam part 43, and the fourth cam part 44 in an E-axis direction are different from the position of the first cam part 41 in the E-axis direction.

In the case where the second to fourth cam parts 42-44 are arranged at the same position about the rotation axis E as the position of the first cam part 41 about the rotation axis E, the plurality of cam parts should be arranged on the same circle about the rotation axis E, and therefore the cam mechanism 400 becomes larger. On the other hand, according to the foregoing configuration, since at least the positions of the second to fourth cam parts 42-44 about the rotation axis E are different from the position of the first cam part 41 about the rotation axis E, the size of the cam mechanism 400 can be reduced. Moreover, since at least the second to fourth cam parts 42-44 can be arranged on a circle different from a circle on which the first cam part 41 is disposed, the degree of freedom of design can be increased.

The cam mechanism 400 rotates the trailing charge lever 332 in the charge direction, and, after completion of rotation of the trailing charge lever 332, rotates the leading charge lever 232 in the charge direction.

According to the foregoing configuration, since the leading charge lever 232 and the trailing charge lever 332 do not simultaneously rotate, the output of the cam mechanism 400 can be reduced. As a result, the size of the drive motor of the cam mechanism 400 can be reduced, and therefore the size of the shutter device 1 can be reduced.

The trailing lock lever 351 includes the lock piece 354 capable of being displaced between the lock position at which the lock piece 354 locks the trailing charge lever 332 and the refracted position at which the lock piece 354 allows passage of the trailing charge lever 332. In the state in which the trailing lock lever 351 is held by the trailing attractive unit 352, the lock piece 354 moves to the retracted position to allow the trailing charge lever 332 to pass by the lock piece 354, and then moves to the lock position to lock the trailing charge lever 332.

According to the foregoing configuration, even if the trailing lock lever 351 is held by the trailing attractive unit 352, the trailing charge lever 332 can easily engage with the lock piece 354.

Other Embodiment

As described above, the foregoing embodiment has been described as example techniques disclosed in the present application. However, the techniques according to the present disclosure are not limited to the embodiment, but are also applicable to those where modifications, substitutions, additions, and omissions are made. In addition, elements described in the foregoing embodiment may be combined to provide a different embodiment. Elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential.

The foregoing embodiment may have the following configurations.

The shutter device 1 includes the leading-curtain unit 200 and the trailing-curtain unit 300, but may not include one of the leading-curtain unit 200 or the trailing-curtain unit 300. For example, an electronic shutter may function as one of the leading-curtain unit 200 or the trailing-curtain unit 300.

In the foregoing embodiment, the leading blade group 210 and the trailing blade group 310 each include four blades, but the number of blades is not limited to the foregoing. A single blade may be provided, or five or more blades may be provided.

In the foregoing embodiment, the leading blade group 210 is driven using the leading drive arm 221, the leading driven arm 222, and the leading drive lever 223, but the present disclosure is not limited to such a configuration. For example, in the configuration in which the leading charge lever 232 directly engages with the leading drive arm 221, the leading drive lever 223 can be omitted. The same applies to driving of the trailing blade group 310.

The configurations for holding the leading drive lever 223 when the leading blade group 210 is in the open state, locking the charged leading charge lever 232 by the leading lock lever 251, attracting the leading lock lever 251, and biasing the leading lock lever 251 in the release direction have been set forth merely for the purpose of examples. Optional configurations may be employed as long as holding of the leading drive lever 223, locking of the leading charge lever 232, and attracting and biasing of the leading lock lever 251 can be realized. For example, leading hold lever 241 has both functions to lock the leading charge lever 232 and to bias the leading lock lever 251 in the release direction. However, the leading hold lever 241 may have only one of such functions, and a member having the other function may be additionally provided. Moreover, the single mechanism including the leading hold lever 241 and the leading biasing lever 253 is configured to move the leading lock lever 251 between the lock position and the release position and to bias the leading lock lever 251 in the release direction, but different mechanisms configured respectively for such functions may be provided. The same applies to the trailing-curtain unit 300.

In the foregoing embodiment, driving of the components and the mechanisms is performed by the single drive cam mechanism 400, but the present disclosure is not limited to such a configuration. A plurality of drive sources may be provided for the components and the mechanisms. For example, a leading cam mechanism configured to drive the leading-curtain unit 200 and a trailing cam mechanism, different from the leading cam mechanism, configured to drive the trailing-curtain unit 300 may be provided.

In the foregoing embodiment, the first cam part 41 first rotates, because of the structure of the foregoing embodiment, the trailing charge lever 332 in the charge direction, and then rotates the leading charge lever 232 in the charge direction after completion of charging of the trailing charge lever 332. However, the present disclosure is not limited to such a configuration. For example, the leading charge lever 232 may be first rotated in the charge direction, and then the trailing charge lever 332 may be rotated in the charge direction after completion of charging of the leading charge lever 232. Note that, if the output of the drive motor of the drive cam mechanism 400 is large, the leading charge lever 232 and the trailing charge lever 332 may be simultaneously rotated.

The lock piece 254 is rotatably provided at the leading lock lever 251, and therefore passage and locking of the leading charge lever 232 are facilitated. However, the configuration for passage and locking of the leading charge lever 232 is not limited to such a configuration. For example, the configuration may be employed, in which the lock piece 254 of the leading lock lever 251 is unrotatable and that the engagement part 232e of the leading charge lever 232 is rotatable. That is, the engagement part 232e may rotate when the leading charge lever 232 passes by the lock piece 254, and the engagement part 232e may return to an original position after the leading charge lever 232 have passed by the lock piece 254. The same applies to the lock piece 354 of the trailing lock lever 351.

In the foregoing embodiment, the leading hold lever 241 engages with the second cam part 42, and the trailing charge lever 332 and the first cam part 41 disengage from each other when the leading drive lever 223 held by the leading hold lever 241 is released. However, the present disclosure is not limited to such a configuration. For example, in the state in which the roller 332d of the trailing charge lever 332 is on the first cam part 41, the roller 241c of the leading hold lever 241 and the second cam part 42 may engage with each other. In such a configuration, the drive motor of the drive cam mechanism 400 may be stopped in the state in which the trailing charge lever 332 and the first cam part 41 engage with each other and in which the leading hold lever 241 and the second cam part 42 engage with each other, thereby using the shutter device 1 as a normally-closed shutter.

As described above, the technique disclosed herein is useful for the shutter device.

Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

What is claimed is:

1. A shutter device comprising:
a base plate in which an opening is formed;
a leading blade configured to open and close the opening;
a leading drive member configured
to rotate in a closing direction to move the leading blade to a closed position at which the leading blade covers the opening and
to rotate in an opening direction opposite to the closing direction to move the leading blade to an open position at which the leading blade opens the opening;
a leading charge mechanism
including a leading drive spring and a leading charge member configured to elastically deform the leading drive spring and
configured to rotate the leading charge member in a charge direction in which the leading drive spring is elastically deformed to generate biasing force and to rotate, using the biasing force of the leading drive spring, the leading charge member in a drive direction opposite to the charge direction to cause the leading charge member to rotate the leading drive member in the opening direction;
a leading lock member configured to lock the leading charge member having rotated in the charge direction;
a first leading hold member configured to hold, using electromagnetic force, the leading lock member which has locked the leading charge member; and
a leading biasing mechanism configured to generate biasing force for biasing the leading lock member in a release direction in which the leading charge member is unlocked after the leading lock member is held by the first leading hold member.

2. The shutter device of claim 1, wherein
in a state in which the leading biasing mechanism biases the leading lock member in the release direction, the first leading hold member releases the leading lock member to rotate the leading charge member in the drive direction by the biasing force of the leading drive spring.

3. The shutter device of claim 1, wherein
in a state in which the leading biasing mechanism unbiases the leading lock member in the release direction, the leading biasing mechanism restricts movement of the leading lock member to prevent the leading lock member from unlocking the leading charge member.

4. The shutter device of claim 1, wherein
the leading biasing mechanism includes a second leading hold member configured to hold the leading drive member in a state in which the leading blade is at the open position, and
the leading drive member is
biased in the closing direction, and
released from the second leading hold member when the leading biasing mechanism biases the leading lock member in the release direction, thereby rotating in the closing direction.

5. The shutter device of claim 4, further comprising:
a leading cam mechanism including
a leading charge cam part configured to rotate the leading charge member in the charge direction, and
a leading biasing cam part configured to operate the leading biasing mechanism such that the leading lock member is biased in the release direction,
wherein the leading biasing mechanism and the second leading hold member move in combination with each other, and are operated by the leading biasing cam part.

6. The shutter device of claim 1, further comprising:
a leading cam mechanism including
a leading charge cam part configured to rotate the leading charge member in the charge direction, and
a leading biasing cam part configured to operate the leading biasing mechanism such that the leading lock member is biased in the release direction.

7. The shutter device of claim 1, wherein
the leading lock member includes a lock piece configured to move between a lock position at which the lock piece locks the leading charge member and a retracted position at which the lock piece allows passage of the leading charge member, and
in a state in which the leading lock member is held by the first leading hold member, the lock piece moves to the retracted position to allow the leading charge member to pass by the lock piece, and then moves to the lock position to lock the leading charge member.

8. The shutter device of claim 1, further comprising:
a trailing blade configured to open and close the opening;
a trailing drive member configured
   to rotate in an opening direction to move the trailing blade to an open position at which the trailing blade opens the opening and
   to rotate in a closing direction opposite to the opening direction to move the trailing blade to a closed position at which the trailing blade covers the opening;
a trailing charge mechanism
   including a trailing drive spring and a trailing charge member configured to elastically deform the trailing drive spring and
   configured to rotate the trailing charge member in a charge direction in which the trailing drive spring is elastically deformed to generate biasing force and to rotate, using the biasing force of the trailing drive spring, the trailing charge member in a drive direction opposite to the charge direction to cause the trailing charge member to rotate the trailing drive member in the closing direction;
a trailing lock member configured to lock the trailing charge member having rotated in the charge direction;
a first trailing hold member configured to hold, using electromagnetic force, the trailing lock member which has locked the trailing charge member; and
a trailing biasing mechanism configured to generate biasing force for biasing the trailing lock member in a release direction in which the trailing charge member is unlocked after the trailing lock member is held by the first trailing hold member.

9. The shutter device of claim 8, wherein
in a state in which the trailing biasing mechanism biases the trailing lock member in the release direction, the first trailing hold member releases the trailing lock member to rotate the trailing charge member in the drive direction by the biasing force of the trailing drive spring.

10. The shutter device of claim 8, wherein
in a state in which the trailing biasing mechanism unbiases the trailing lock member in the release direction, the trailing biasing mechanism restricts movement of the trailing lock member to prevent the trailing lock member from unlocking the trailing charge member.

11. The shutter device of claim 8, further comprising:
a second trailing hold member configured to hold the trailing drive member in a state in which the trailing blade is at the closed position,
wherein the trailing drive member is
   biased in the opening direction, and
   released from the second trailing hold member to rotate in the opening direction.

12. The shutter device of claim 11, wherein
the second trailing hold member releases the trailing drive member when the trailing biasing mechanism biases the trailing lock member in the release direction.

13. The shutter device of claim 12, further comprising:
a trailing cam mechanism including
   a trailing charge cam part configured to rotate the trailing charge member in the charge direction, and
   a trailing biasing cam part configured to operate the trailing biasing mechanism such that the trailing lock member is biased in the release direction.

14. The shutter device of claim 13, wherein
the trailing cam mechanism further includes a trailing release cam part configured to operate the second trailing hold member.

15. The shutter device of claim 14, further comprising:
a leading cam mechanism including
   a leading charge cam part configured to rotate the leading charge member in the charge direction, and
   a leading biasing cam part configured to operate the leading biasing mechanism such that the leading lock member is biased in the release direction,
wherein the leading cam mechanism and the trailing cam mechanism are an identical cam mechanism.

16. The shutter device of claim 15, wherein
the leading charge cam part and the trailing charge cam part are an identical cam part.

17. The shutter device of claim 15, wherein
the cam mechanism is rotatably driven about a predetermined rotation axis, and
positions of the leading biasing cam part, the trailing biasing cam part, and the trailing release cam part in a direction along the rotation axis are different from positions of the leading charge cam part and the trailing charge cam part in the direction along the rotation axis.

18. The shutter device of claim 15, wherein
the cam mechanism rotates one of the leading charge member or the trailing charge member in the charge direction, and, after completion of rotation of the one of the leading charge member or the trailing charge member, rotates the other one of the leading charge member or the trailing charge member in the charge direction.

19. The shutter device of claim 8, wherein
the trailing lock member includes a lock piece configured to move between a lock position at which the lock piece locks the trailing charge member and a retracted position at which the lock piece allows passage of the trailing charge member, and
in a state in which the trailing lock member is held by the first trailing hold member, the lock piece moves to the retracted position to allow the trailing charge member to pass by the lock piece, and then moves to the lock position to lock the trailing charge member.

20. A shutter device comprising:
a base plate in which an opening is formed;
a trailing blade configured to open and close the opening;
a trailing drive member configured
   to rotate in an opening direction to move the trailing blade to an open position at which the trailing blade opens the opening and
   to rotate in a closing direction opposite to the opening direction to move the trailing blade to a closed position at which the trailing blade covers the opening;
a trailing charge mechanism
   including a trailing drive spring and a trailing charge member configured to elastically deform the trailing drive spring and
   configured to rotate the trailing charge member in a charge direction in which the trailing drive spring is elastically deformed to generate biasing force and to rotate, using the biasing force of the trailing drive spring, the trailing charge member in a drive direction opposite to the charge direction to cause the trailing charge member to rotate the trailing drive member in the closing direction;
a trailing lock member configured to lock the trailing charge member having rotated in the charge direction;
a first trailing hold member configured to hold, using electromagnetic force, the trailing lock member which has locked the trailing charge member; and
a trailing biasing mechanism configured to generate biasing force for biasing the trailing lock member in a release direction in which the trailing charge member is unlocked after the trailing lock member is held by the first trailing hold member.

21. The shutter device of claim 20, wherein
in a state in which the trailing biasing mechanism biases the trailing lock member in the release direction, the first trailing hold member releases the trailing lock member to rotate the trailing charge member in the drive direction by the biasing force of the trailing drive spring.

22. The shutter device of claim 20, wherein
in a state in which the trailing biasing mechanism unbiases the trailing lock member in the release direction, the trailing biasing mechanism restricts movement of the trailing lock member to prevent the trailing lock member from unlocking the trailing charge member.

23. The shutter device of claim 20, further comprising:
a second trailing hold member configured to hold the trailing drive member in a state in which the trailing blade is at the closed position,
wherein the trailing drive member is
biased in the opening direction, and
released from the second trailing hold member to rotate in the opening direction.

24. The shutter device of claim 23, wherein
the second trailing hold member releases the trailing drive member before the trailing biasing mechanism biases the trailing lock member in the release direction.

25. The shutter device of claim 23, further comprising:
a trailing cam mechanism including
a trailing charge cam part configured to rotate the trailing charge member in the charge direction, and
a trailing biasing cam part configured to operate the trailing biasing mechanism such that the trailing lock member is biased in the release direction,
wherein the trailing cam mechanism further includes a trailing release cam part configured to operate the second trailing hold member.

26. The shutter device of claim 20, further comprising:
a trailing cam mechanism including
a trailing charge cam part configured to rotate the trailing charge member in the charge direction, and
a trailing biasing cam part configured to operate the trailing biasing mechanism such that the trailing lock member is biased in the release direction.

27. The shutter device of claim 20, wherein
the trailing lock member includes a lock piece configured to move between a lock position at which the lock piece locks the trailing charge member and a retracted position at which the lock piece allows passage of the trailing charge member, and
in a state in which the trailing lock member is held by the first trailing hold member, the lock piece moves to the retracted position to allow the trailing charge member to pass by the lock piece, and then moves to the lock position to lock the trailing charge member.

\* \* \* \* \*